US012275211B2

(12) United States Patent
Graham et al.

(10) Patent No.: US 12,275,211 B2
(45) Date of Patent: Apr. 15, 2025

(54) MACHINE FOR FORMING A CONTAINER FROM A BLANK

(71) Applicant: WestRock Shared Services, LLC, Atlanta, GA (US)

(72) Inventors: Thomas Dean Graham, Winter Garden, FL (US); Amer Aganovic, Orlando, FL (US); Claudio D'Alesio, Windermere, FL (US)

(73) Assignee: WestRock Shared Services, LLC, Atlanta, GA (US)

( * ) Notice: Subject to any disclaimer, the term of this patent is extended or adjusted under 35 U.S.C. 154(b) by 0 days.

(21) Appl. No.: 18/662,901

(22) Filed: May 13, 2024

(65) Prior Publication Data

US 2024/0293990 A1 Sep. 5, 2024

Related U.S. Application Data

(60) Division of application No. 17/371,881, filed on Jul. 9, 2021, now Pat. No. 11,981,102, which is a continuation of application No. 16/206,366, filed on Nov. 30, 2018, now Pat. No. 11,059,252.

(51) Int. Cl.

| | |
|---|---|
| ***B31B 50/00*** | (2017.01) |
| ***B31B 50/02*** | (2017.01) |
| ***B31B 50/06*** | (2017.01) |
| ***B65D 5/42*** | (2006.01) |
| ***G06Q 50/10*** | (2012.01) |

(52) U.S. Cl.

CPC .......... *B31B 50/006* (2017.08); *B31B 50/003* (2017.08); *B31B 50/004* (2017.08); *B31B 50/005* (2017.08); *B31B 50/022* (2017.08); *B31B 50/06* (2017.08); *B65D 5/4204* (2013.01); *B65D 5/4266* (2013.01); *B65D 2585/366* (2013.01); *G06Q 50/10* (2013.01)

(58) Field of Classification Search

CPC ..... B31B 50/06; B31B 50/004; B31B 50/003; B31B 50/006

See application file for complete search history.

(56) References Cited

U.S. PATENT DOCUMENTS

| | | | |
|---|---|---|---|
| 1,850,493 | A | 3/1932 | Elliott |
| 2,705,514 | A | 4/1955 | Reece |
| 2,969,105 | A | 1/1961 | Jones |
| 2,973,858 | A | 3/1961 | Laneve |
| 3,048,088 | A | 8/1962 | Fischer |
| 3,462,065 | A | 8/1969 | Asman |
| 3,512,697 | A | 5/1970 | Robinson |

(Continued)

*Primary Examiner* — Daniel Jeremy Leeds

(74) *Attorney, Agent, or Firm* — Neil G. Cohen; Rohini K. Garg

(57) ABSTRACT

Provided herein is a machine for forming a container from a blank including a tray and a lid. The machine has an upstream end where the blank is loaded and a downstream end where the container is discharged and includes a frame, a pre-forming assembly, and a mandrel assembly. The pre-forming assembly is configured to partially form the lid and the tray by folding each of a plurality of side panels of the blank and further form the tray by partially folding a front panel assembly of the blank, the front panel assembly including a front panel and a roll-over panel. The mandrel assembly is mounted to the frame and configured to engage a bottom panel of the tray to form each of a plurality of corners of the tray and fold the roll-over panel to form a front wall of the container.

10 Claims, 13 Drawing Sheets

(56) References Cited

U.S. PATENT DOCUMENTS

| | | | |
|---|---|---|---|
| 3,527,460 | A | 9/1970 | Lopez |
| 3,583,889 | A | 6/1971 | Califano |
| 3,923,234 | A | 12/1975 | Lund, Jr. |
| 4,190,757 | A | 2/1980 | Turpin et al. |
| 4,441,626 | A | 4/1984 | Hall |
| 4,476,989 | A | 10/1984 | Larsen |
| 4,747,485 | A | 5/1988 | Chaussadas |
| 4,765,535 | A | 8/1988 | Zion |
| 4,809,908 | A | 3/1989 | Keefe |
| 4,919,326 | A | 4/1990 | Deiger |
| 4,957,237 | A | 9/1990 | Madonna et al. |
| 4,984,734 | A | 1/1991 | Zion et al. |
| 4,993,625 | A | 2/1991 | Stease et al. |
| 5,000,374 | A | 3/1991 | Deiger |
| 5,002,221 | A | 3/1991 | Ragan |
| 5,052,369 | A | 10/1991 | Johnson |
| 5,056,710 | A | 10/1991 | Ritter |
| 5,071,062 | A | 12/1991 | Bradley et al. |
| 5,110,039 | A | 5/1992 | Philips |
| 5,125,566 | A | 6/1992 | Deiger |
| 5,211,329 | A | 5/1993 | Patton |
| 5,263,634 | A | 11/1993 | Korine |
| 5,269,741 | A | 12/1993 | Fischer |
| 5,338,921 | A | 8/1994 | Maheux et al. |
| 5,358,173 | A | 10/1994 | Mertz |
| 5,368,225 | A | 11/1994 | Ritter |
| 5,381,949 | A | 1/1995 | Correll |
| 5,402,929 | A | 4/1995 | Ritter et al. |
| 5,429,576 | A | 7/1995 | Doderer-Winkler |
| 5,445,286 | A | 8/1995 | Guimarin |
| 5,452,845 | A | 9/1995 | Ritter |
| 5,476,216 | A | 12/1995 | Robertella et al. |
| 5,535,940 | A | 7/1996 | Olds |
| 5,553,771 | A | 9/1996 | Correll |
| 5,560,539 | A | 10/1996 | Baxter |
| 5,586,716 | A | 12/1996 | Correll |
| 5,595,339 | A | 1/1997 | Correll |
| 5,702,054 | A | 12/1997 | Philips et al. |
| 5,713,509 | A | 2/1998 | Correll |
| 5,752,651 | A | 5/1998 | Correll |
| 5,799,864 | A | 9/1998 | Mertz |
| 5,806,755 | A | 9/1998 | Correll |
| 5,833,130 | A | 11/1998 | Correll |
| 5,881,948 | A | 3/1999 | Correll |
| 5,918,797 | A | 7/1999 | Correll |
| 5,950,912 | A | 9/1999 | Economopoulos |
| 5,961,035 | A | 10/1999 | Correll |
| 6,016,951 | A | 1/2000 | Correll |
| 6,065,669 | A | 5/2000 | Correll |
| 6,092,715 | A | 7/2000 | Correll |
| 6,109,512 | A | 8/2000 | Morrison |
| 6,196,448 | B1 | 3/2001 | Correll |
| 6,206,277 | B1 | 3/2001 | Correll |
| 6,223,978 | B1 | 5/2001 | Drager |
| 6,290,122 | B1 | 9/2001 | Correll |
| 6,547,125 | B2 | 4/2003 | Correll |
| 6,568,586 | B1 | 5/2003 | VanEsley et al. |
| 6,685,085 | B2 | 2/2004 | Hanna |
| 6,748,722 | B2 | 6/2004 | Correll |
| 6,749,106 | B2 | 6/2004 | Keefe, Jr. et al. |
| 6,922,976 | B2 | 8/2005 | Correll |
| 8,025,207 | B1 | 9/2011 | Correll |
| D649,040 | S | 11/2011 | Sanders |
| 8,627,998 | B2 | 1/2014 | Martinez |
| 8,690,043 | B2 | 4/2014 | Holch et al. |
| 9,033,208 | B2 | 5/2015 | Martinez |
| 9,149,982 | B2 | 10/2015 | Shanton et al. |
| 9,359,102 | B2 | 6/2016 | Martinez |
| 9,415,895 | B2 | 8/2016 | James et al. |
| 9,850,022 | B2 | 12/2017 | Martinez |
| 9,908,660 | B2 | 3/2018 | James et al. |
| 10,118,726 | B2 | 11/2018 | James et al. |
| 2001/0000561 | A1 | 5/2001 | Correll |
| 2003/0015578 | A1 | 1/2003 | Keefe, Jr. et al. |
| 2003/0017243 | A1 | 1/2003 | Goldman |
| 2003/0047593 | A1 | 3/2003 | Correll |
| 2003/0121961 | A1 | 7/2003 | Pilgrim |
| 2003/0203087 | A1 | 10/2003 | Goldman et al. |
| 2004/0035523 | A1 | 2/2004 | Middelstadt et al. |
| 2004/0222276 | A1 | 11/2004 | Correll |
| 2004/0222277 | A1 | 11/2004 | Correll |
| 2004/0222278 | A1 | 11/2004 | Correll |
| 2005/0011939 | A1 | 1/2005 | Angelopoulos et al. |
| 2005/0103832 | A1 | 5/2005 | Correll |
| 2005/0115944 | A1 | 6/2005 | Goldman et al. |
| 2006/0140746 | A1 | 6/2006 | Koon |
| 2006/0154791 | A1 | 7/2006 | Reuteler et al. |
| 2006/0208046 | A1 | 9/2006 | Dennen et al. |
| 2007/0131667 | A1 | 6/2007 | Amato |
| 2007/0199981 | A1 | 8/2007 | Oliveira |
| 2009/0078698 | A1 | 3/2009 | Middleton et al. |
| 2010/0108750 | A1 | 5/2010 | Coleman, Jr. |
| 2011/0253772 | A1 | 10/2011 | Holch et al. |
| 2012/0100976 | A1 | 4/2012 | Graham |
| 2015/0007287 | A1 | 1/2015 | Graham |
| 2015/0072847 | A1 | 3/2015 | Graham et al. |
| 2016/0297563 | A1 | 10/2016 | James et al. |
| 2017/0066552 | A1 | 3/2017 | James et al. |
| 2017/0313464 | A1 | 11/2017 | McCarthy et al. |

MACHINE FOR FORMING A CONTAINER FROM A BLANK

CROSS-REFERENCE TO RELATED APPLICATIONS

The present application is a divisional of U.S. patent application Ser. No. 17/371,881 filed on Jul. 9, 2021, which claims the benefit of U.S. patent application Ser. No. 16/206,366 filed on Nov. 30, 2018, now issued U.S. Pat. No. 11,059,252, the contents of each of which are incorporated herein by reference in their entirety.

BACKGROUND

This disclosure relates generally to a machine for forming a container, and more specifically, to a machine for forming a container including a lid and a tray from a blank.

Containers and boxes that include a lid and a tray, such as pizza boxes and cake boxes, are formed from complex blanks that include many side panels that need to be folded. These containers are typically formed manually, because the many different panels make folding the containers automatically (e.g., using a machine) difficult. Therefore, there is a need for a machine that can form a container including a lid and a tray from a blank.

BRIEF DESCRIPTION

In one aspect, a machine for forming a container from a blank is provided. The container includes a tray and a lid. The machine has an upstream end where the blank is loaded and a downstream end where the formed container is discharged. The machine includes a frame, a deck coupled to the frame, wherein the blank is positioned on the deck, and a pre-forming section. The pre-forming section includes a plurality of stations through which the blank is advanced in a container-forming direction. The plurality of stations include a first station configured to partially form the lid and the tray, and at least a second station downstream from the first station and configured to further form the tray by partially folding a front panel assembly of the blank, the front panel assembly including a front panel and a roll-over panel. The pre-forming section also includes a bar extending above the deck in the container-forming direction across at least the first second stations, wherein a space defined between the bar and the deck is less than or equal to a height of the front panel assembly. The machine also includes a mandrel assembly mounted to the frame and configured to engage a bottom panel of the tray to form each of a plurality of corners of the tray and fold the roll-over panel to form a front wall of the container.

In another aspect, a method of forming a container from a blank using a machine is provided. The container includes a tray and a lid, and the machine includes a deck mounted to a frame, a pre-form section positioned upstream from a mandrel assembly, the pre-form section including a plurality of stations and a bar extending above the deck in a container-forming direction across at least the first second stations, the mandrel assembly including a mandrel that includes a plate and compression members coupled to each corner of the plate. The method includes receiving the blank at a first station of the plurality of stations, partially forming the container at the first station by folding each of a plurality of side panels of the blank, and transferring the blank in a container-forming direction to at least a second station of the plurality of stations, while maintaining justification of the partially formed container using the bar. The method also includes further forming the container using at least a second station of the plurality of stations, by folding a front panel assembly including a front panel and a roll-over panel of the blank, transferring the partially formed container from the pre-forming section to the mandrel assembly, actuating at least a first actuator associated with the mandrel to fold the roll-over panel to form a front wall of the container, actuating at least a second actuator associated with the compression members of the mandrel to form corners of the tray, and folding the lid to contact the tray.

In a further aspect, a machine for forming a container from a blank including a tray and a lid is provided. The machine has an upstream end where the blank is loaded and a downstream end where the container is discharged and includes a frame, a pre-forming assembly, and a mandrel assembly. The pre-forming assembly is configured to partially form the lid and the tray by folding each of a plurality of side panels of the blank and further form the tray by partially folding a front panel assembly of the blank, the front panel assembly including a front panel and a roll-over panel. The mandrel assembly is mounted to the frame and configured to engage a bottom panel of the tray to form each of a plurality of corners of the tray and fold the roll-over panel to form a front wall of the container.

In another aspect, a method of forming a container from a blank using a machine is provided. The container includes a tray and a lid, and the machine includes a pre-form assembly positioned upstream from a mandrel assembly. The mandrel assembly includes a mandrel that includes a plate and compression members coupled to each corner of the plate. The method includes partially forming the container using the pre-form assembly, by folding each of a plurality of side panels of the blank and partially folding a front panel assembly including a front panel and a roll-over panel of the blank. The method also includes transferring the partially formed container from the pre-forming assembly to the mandrel assembly, actuating at least a first actuator associated with the mandrel to fold the roll-over panel to form a front wall of the container, and actuating at least a second actuator associated with the compression members of the mandrel to form corners of the tray. The method further includes folding the lid to contact the tray.

DETAILED DESCRIPTION

The machine described herein for forming a container from a blank overcomes the limitations of known machines for forming containers. The machine described herein includes a pre-forming assembly and a mandrel assembly.

Figure 1:
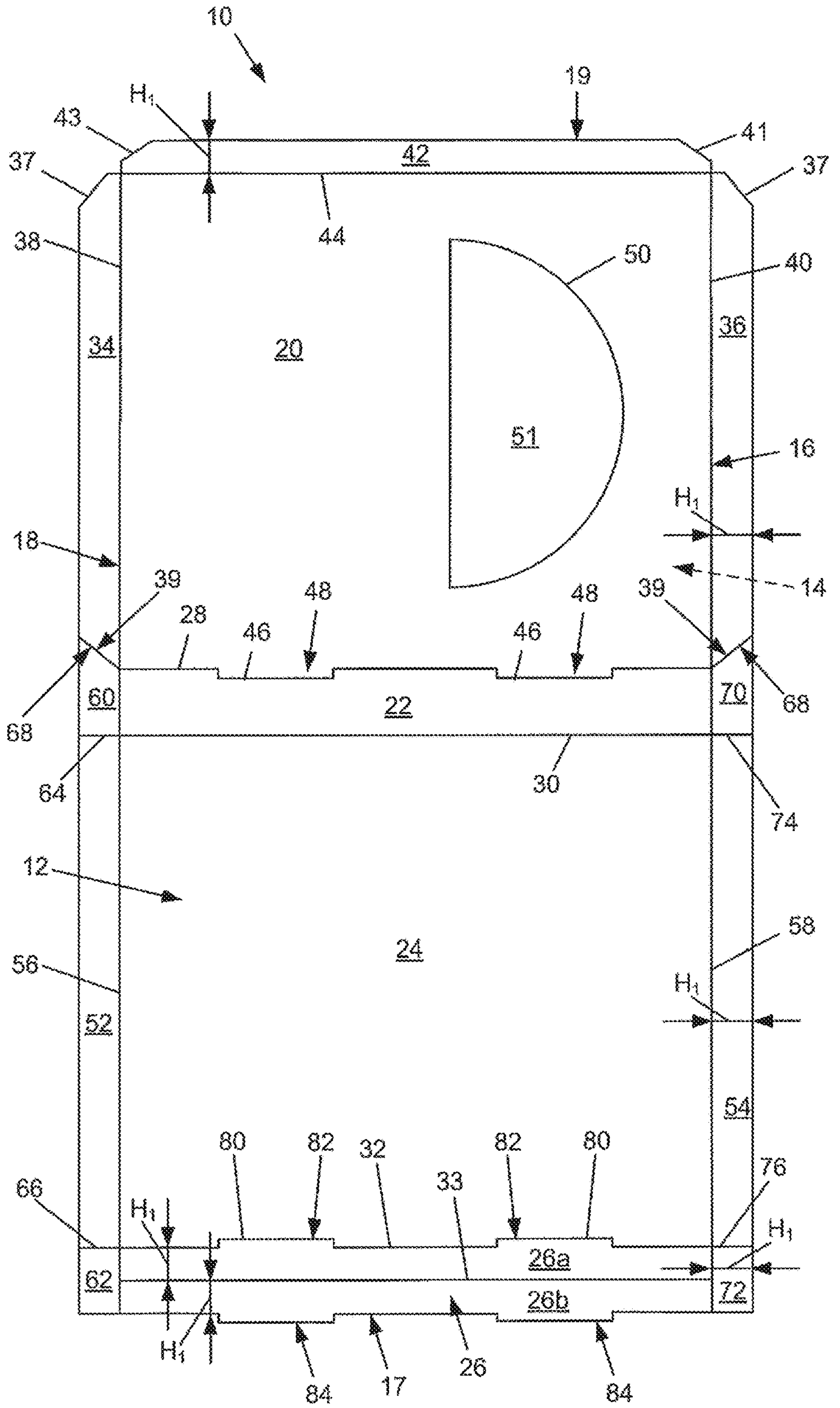
FIG. 1 is a top plan view of an example embodiment of a blank of sheet material.

FIG. 1 illustrates a top plan view of an example embodiment of a substantially flat blank 10 of sheet material. As shown in FIG. 1, blank 10 has an interior surface 12 and an exterior surface 14. In certain embodiments, portions of exterior surface 14 and/or interior surface 12 of blank 10 include printed graphics, such as advertising and/or promotional materials.

Further, blank 10 extends laterally or horizontally from a leading edge 16 to an opposing trailing edge 18 and extends longitudinally from a first end 17 to a second end 19. Blank 10 includes a top panel 20, a back panel 22, a bottom panel 24, and a front panel assembly 26 coupled together along preformed, generally parallel, fold lines 28, 30, and 32, respectively. More specifically, back panel 22 extends from top panel 20 along fold line 28, bottom panel 24 extends from back panel 22 along fold line 30, and front panel assembly 26 extends from bottom panel 24 along fold line 32. Fold line 32 defines a front edge of bottom panel 24, and fold line 30 defines a back edge of bottom panel 24. Fold line 28 defines a back edge of top panel 20 and second end 19 defines a front edge of top panel 20. Front panel assembly 26 includes a front panel 26*a* and a roll-over panel 26*b* coupled together along a fold line 33, and roll-over panel 26*b* includes one or more tabs 84. Fold lines 28, 30, 32, and 33, as well as other fold lines and/or hinge lines described herein, may include any suitable line of weakening and/or line of separation known to those skilled in the art and guided by the teachings herein provided.

Top panel 20 includes a first top side panel 34 and a second top side panel 36 extending therefrom along respective fold lines 38 and 40. More specifically, first top side panel 34 extends from top panel 20 along fold line 38, and second top side panel 36 extends from top panel 20 along fold line 40. Fold lines 38 and 40 define side edges of top panel 20. Top panel 20 further includes a top front panel 42 extending therefrom along fold line 44. Fold line 44 defines a front edge of top panel 20. Each top side panel 34 and 36 extends from a first angled edge 37 to a second angled edge 39, and top front panel 42 extends from a first angled edge 41 to a second angled edge 43. Although each top side panel 34 and 36 and the top front panel 42 is described as including angled edges 37 and 39, and 41 and 43, respectively, one or none of top side panels 34 and/or 36 or top front panel 42 may include angled edges 37, 39, 41, and 43. Further, top side panels 34 and/or 36 and top front panel 42 may include arcuate edges and/or alternatively shaped edges that extend along the length of the panels.

In the exemplary embodiment, fold line 28 includes cut lines 46. More specifically, cut lines 46 each define tab portions 48 extending from top panel 20 into back panel 22. When blank 10 is assembled to construct a container 200 (shown in FIG. 2), tab portions 48 extend from top panel 20 and define an opening 49 (shown in FIG. 2) extending through container 200. In the exemplary embodiment, cut lines 46 facilitate easier folding (e.g., folding requiring reduced folding forces) of top panel 20 along fold line 28 when blank 10 is formed into container 200. Although cut lines 46 are shown and described as part of and/or extending from fold line 28, and tab portions 48 are shown and described as extending from top panel 20, fold line 28 may not include cut lines 46, and top panel 20 may not include tab portions 48. Moreover, in an alternative embodiment, fold line 28 may include more than two cut lines and/or top panel 20 may include more than two tab portions.

In the exemplary embodiment, top panel 20 includes a semi-circular-shaped cut-out 50. In this embodiment, a transparent sheet 51 is positioned within cut-out 50 and is made of a clear plastic material to show the contents of the container 200 when blank 10 is formed into container 200. In other embodiments, cut-out 50 is circular, rectangular, or any other suitable shape such that cut-out 50 is smaller than top panel 20. Further, in other embodiments, there is no cut-out 50 in top panel 20.

Bottom panel 24 includes a first bottom side panel 52 and a second bottom side panel 54 extending therefrom along respective fold lines 56 and 58. More specifically, first bottom side panel 52 extends from bottom panel 24 along fold line 56, and second bottom side panel 54 extends from bottom panel 24 along fold line 58. Fold lines 56 and 58 define side edges of bottom panel 24. Furthermore, first bottom side panel 52 includes a glue panel 60 (a "first glue panel" 60) and a tuck panel 62 (a "first tuck panel" 62) extending from respective fold lines 64 and 66. More specifically, glue panel 60 extends from first bottom side panel 52 along fold line 64, and tuck panel 62 extends from first bottom side panel 52 along fold line 66. Second bottom side panel 54 includes a glue panel 70 (a "second glue panel" 70) and a tuck panel 72 (a "second tuck panel" 72) extending from respective fold lines 74 and 76. More specifically, glue panel 70 extends from second bottom side panel 54 along fold line 74, and tuck panel 72 extends from second bottom side panel 54 along fold line 76. Glue panels 60 and 70 and tuck panels 62 and 72 of respective bottom side panels 52 and 54 are substantially the same. Glue panels 60 and 70 include angled edges 68. In other embodiments, the edges of glue panels 60 and 70 are substantially straight such that they are substantially the same as tuck panels 62 and 72. Fold lines 66 and 76 further define the front edge of bottom panel 24, and fold lines 64 and 74 further define the back edge of bottom panel 24.

In the exemplary embodiment, fold line 32 includes cut lines 80. More specifically, cut lines 80 each define a respective tab cut-out 82. When blank 10 is assembled to construct container 200, tab cut-outs 82 are configured to receive and retain the tabs 84 of roll-over panel 26*b*. In an alternative embodiment, fold line 32 may include one cut line 80 or more than two cut lines 80 to receive a corresponding number of tabs 84 extending from roll-over panel 26*b*.

In the exemplary embodiment, front panel 26*a*, roll-over panel 26*b*, top side panels 34 and 36, top front panel 42, bottom side panels 52 and 54, glue panels 60 and 70, and tuck panels 62 and 72 are referred to collectively and generally as "extension panels," and are all substantially the same height $H_1$. When blank 10 is formed into container 200, a lid 202 (shown in FIG. 2) formed from top panel 20, tightly fits around a tray 204 (also shown in FIG. 2) formed from back panel 22, bottom panel 24, and front panel assembly 26, such that there is little to no space between lid 202 and tray 204 because the extension panels each have the same height $H_1$. In other embodiments, the extension panels may have varying heights depending on the design of blank 10 and container 200.

Figure 2:
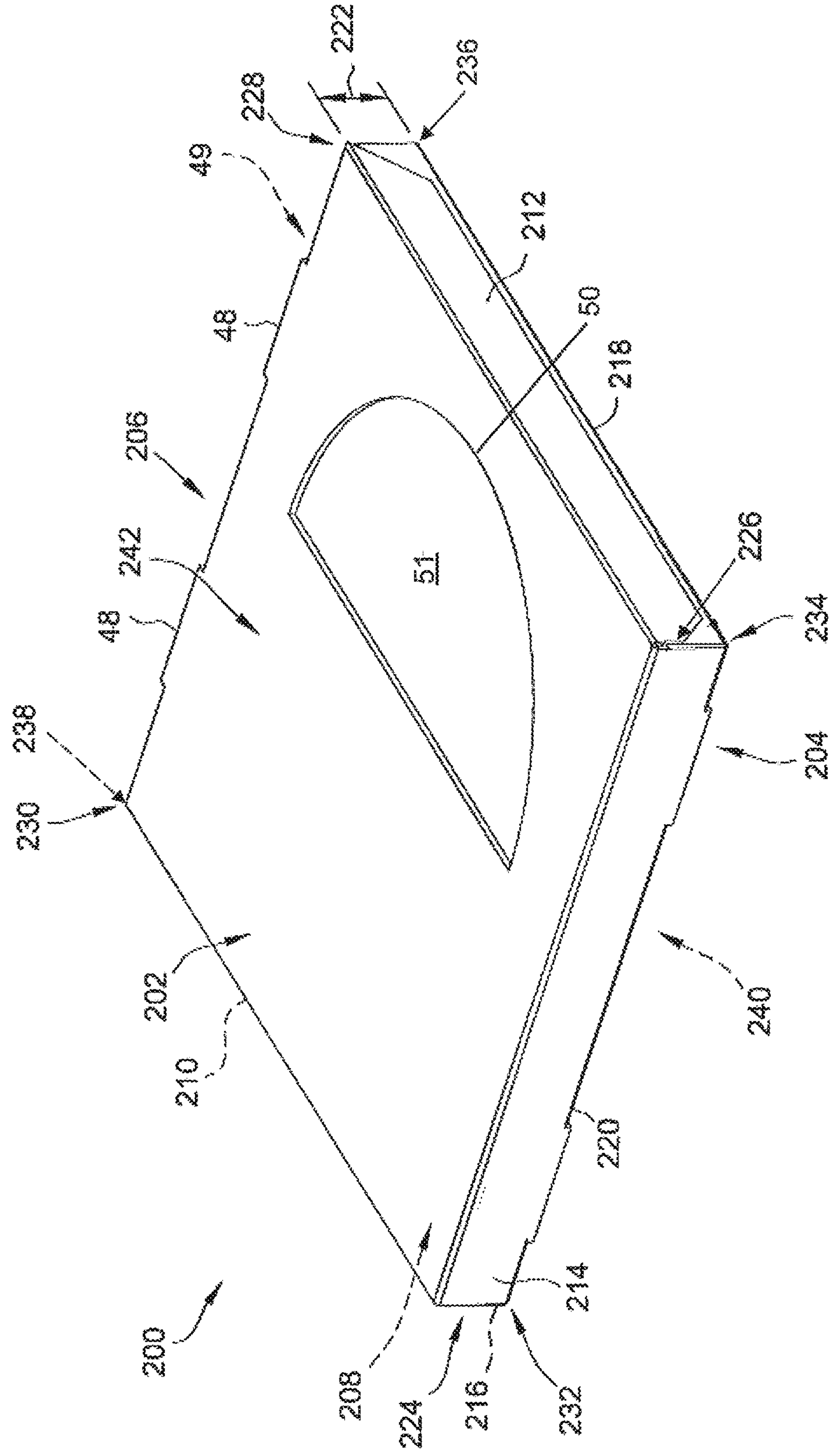
FIG. 2 is a perspective view of an example embodiment of a container formed from the blank shown in FIG. 1 in a closed state.

As will be described below in more detail with reference to FIGS. 2-11, blank 10 is intended to form a container 200 as shown in FIG. 2, by folding and/or securing back panel 22, front panel assembly 26, front panel 26*a*, roll-over panel 26*b*, side panels 34, 36, 52, and/or 54, top front panel 42, glue panels 60 and/or 70, and/or tuck panels 62 and/or 72. Of course, blanks having shapes, sizes, and configurations different from blank 10 described and illustrated herein may be used in a machine 1000 (shown in FIG. 3) to from container 200 (shown in FIG. 2) without departing from the scope of the present invention. For example, blank 10 is shown as a four-sided container, but could be a six-sided container, an eight-sided container, or an N-sided container without departing from the scope of this disclosure.

FIG. 2 illustrates a perspective view of an example container 200, which is erected and in a closed configuration, that may be formed from blank 10 (shown in FIG. 1). Referring to FIGS. 1 and 2, in the example embodiment, container 200 includes a lid 202, a tray 204, each including a plurality of walls, and a back wall 206 defining a cavity 208. More specifically, lid 202 includes a first lid side wall 210, a second lid side wall 212, and a lid front wall 214, and tray 204 includes a first tray side wall 216, a second tray side wall 218, and a tray front wall 220. Lid 202 and tray 204 are coupled to each other at back wall 206. Bottom panel 24 forms a bottom wall 240 of container 200/tray 204, and top panel 20 forms a top wall 242 of container 200/lid 202. Lid 202 includes cut-out 50, sheet 51, and tab portions 48. Tab portions 48 are defined by cut lines 46 and form openings 49 in the back wall 206 of the container 200.

First lid side wall 210 includes first top side panel 34, second lid side wall 212 includes second top side panel 36, and lid front wall 214 includes top front panel 42. First tray side wall 216 includes first bottom side panel 52, second tray side wall 218 includes second bottom side panel 54, and tray front wall 220 includes front panel 26*a* of front panel assembly 26, roll-over panel 26*b*, and tuck panels 62 and 72. Back wall 206 includes back panel 22 and glue panels 60 and 70. Each wall 206, 210, 212, 214, 216, 218, and 220 has a height 222. Although each wall may have a different height without departing from the scope of the present disclosure, in the embodiment shown FIGS. 1 and 2, each wall 206, 210, 212, 214, 216, 218, and 220 has substantially the same height 222. That is, container 200 is shown with tray 204 partially exposed below lid 202 in FIG. 2; however, this illustrated arrangement is provided for clarity only. Tray 204 may be completely enclosed by lid 202.

Although container 200 may have other orientations without departing from the scope of the present disclosure, in the embodiment shown in FIG. 2, lid front wall 214, tray front wall 220, and back wall 206 are substantially parallel to each other and lid side walls 210 and 212 and tray side walls 216 and 218 are substantially parallel to each other. That is, in the example embodiment, first lid side wall 210 connects to lid front wall 214 and forms first lid corner 224, lid front wall 214 connects to second lid side wall 212 and forms second lid corner 226, second lid side wall 212 connects to back wall 206 and forms third lid corner 228, and back wall 206 connects to first lid side wall 210 and forms fourth lid corner 230. Further, first tray side wall 216 connects to tray front wall 220 and forms first tray corner 232, tray front wall 220 connects to second tray side wall 218 and forms second tray corner 234, second tray side wall 218 connects to back wall 206 and forms third tray corner 236, and back wall 206 connects to first tray side wall 216 and forms fourth tray corner 238. In the exemplary embodiment, all of the corners 224, 226, 228, 230, 232, 234, 236, and 238 are substantially right angles formed by the respective walls 206, 210, 212, 214, 216, 218, and 220.

Top side panels 34 and 36, top front panel 42 (that is, lid walls 210, 212, and 214), and back panel 22 (that is, back wall 206) are each oriented generally perpendicular to top wall 242, and bottom side panels 52 and 54, front panel assembly 26 (that is, tray walls 216, 218, 220), and back panel 22 (that is, back wall 206) are each oriented generally perpendicular to bottom wall 240. Glue panels 60 and 70 are oriented generally perpendicular to respective bottom side panels 52 and 54 to further define back wall 206, and tuck panels 62 and 72 are oriented generally perpendicular to respective bottom side panels 52 and 54 to further define tray front wall 220. More specifically, glue panels 60 and 70 are folded and coupled to back panel 22 to form back wall 206, and tuck panels 62 and 72 are folded inside front panel assembly 26 to form tray front wall 220 (i.e., front panel 26*a* is coupled against tuck panels 62 and 72, and roll-over panel 26*b* of front panel assembly 26 is folded over tuck panels 62 and 72, as described further herein).

Although container 200 may be secured together using any suitable fastener at any suitable location on container 200 without departing from the scope of the present disclosure, in one embodiment, adhesive (not shown) is applied to an inner surface of back panel 22 and/or an outer surface of glue panels 60 and 70, such that back panel 22 and glue panels 60 and 70 are bonded together to form back wall 206. In one embodiment, adhesive may also be applied to exterior and/or interior surfaces of tuck panels 62 and 72 and/or to an interior surface of front panel 26*a* of front panel assembly 26 and/or to an interior surface of roll-over panel 26*b*, to more tightly secure tuck panels 62 and 72 to front panel assembly 26. As a result of the above example embodiment of container 200, lid 202 and/or tray 204 may be securely closed so that various products may be securely contained within container 200.

Figure 3:
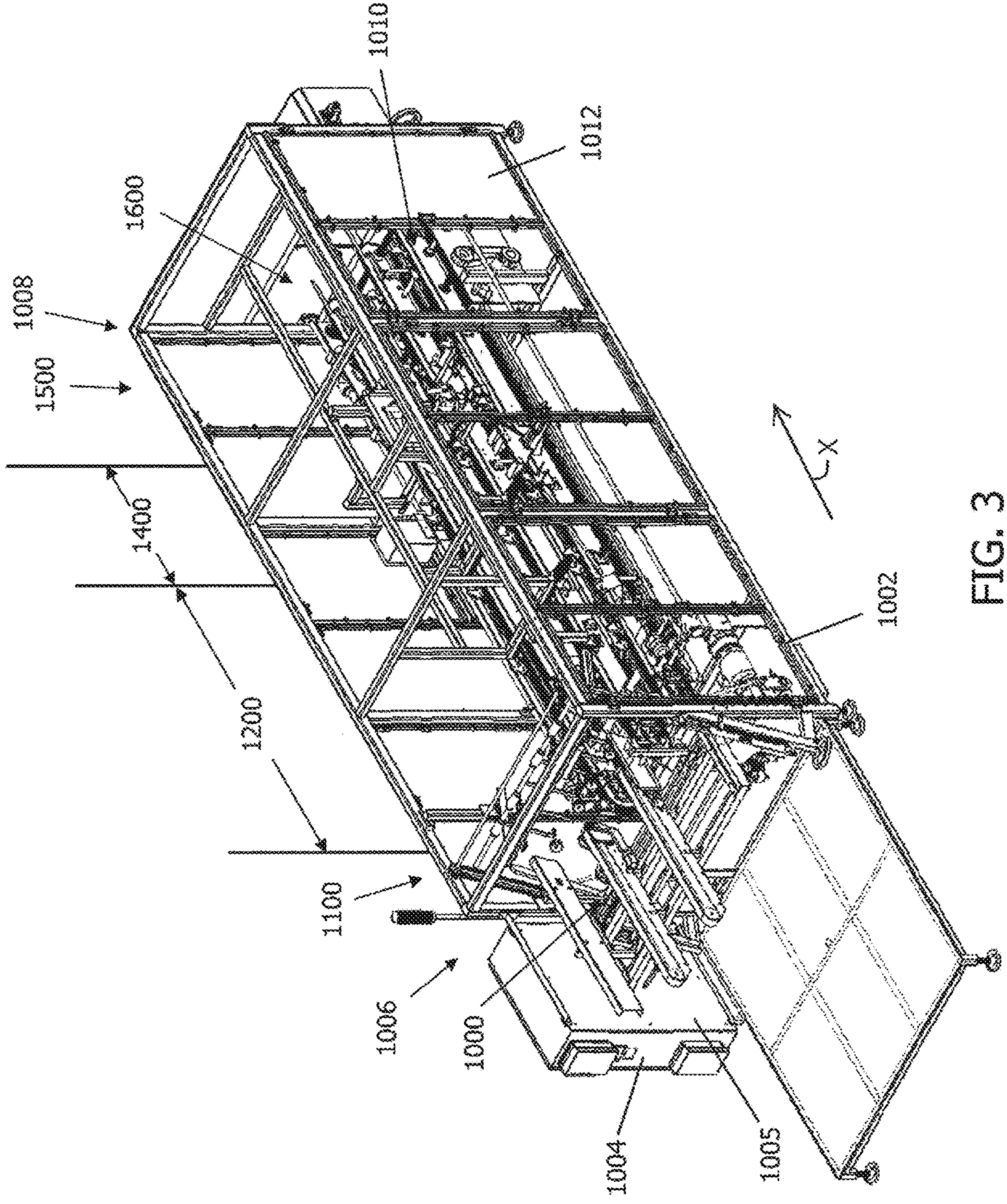
FIG. 3 is a perspective view of an exemplary machine for forming a container, such as the container shown in FIG. 2, from a blank, such as the blank shown in FIG. 1, the machine including a pre-forming section, a mandrel section, a post-forming section, and an outfeed section.

FIG. 3 illustrates a perspective view of an example machine 1000 for forming a container, such as container 200 (shown in FIG. 2) from a blank of sheet material, such as blank 10 (shown in FIG. 1). Machine 1000 will be discussed hereafter with reference to forming container 200 from blank 10; however, machine 1000 may be used to form a box or any other container having any size, shape, and/or configuration from a blank having any size, shape, and/or configuration without departing from the scope of the present disclosure.

As shown in FIG. 3, machine 1000 includes a blank transfer section 1100, a pre-form section 1200, a mandrel section 1400, a post-form section 1500, and an outfeed section 1600, each positioned with respect to and/or coupled to a frame 1002. A control panel 1004 is coupled in operative control communication with one or more components of machine 1000. Control panel 1004 includes a control system 1005. Blank transfer section 1100 is positioned at an upstream end 1006 of machine 1000 with respect to a container-forming path direction indicated by an arrow X. Pre-form section 1200 is positioned downstream from blank transfer section 1100 in container-forming path direction X. Moreover, mandrel section 1400 is positioned downstream from pre-form section 1200 in container-forming path direction X, post-form section 1500 is positioned downstream from mandrel section 1400 in container-forming path direction X, and outfeed section 1600 is positioned at a downstream end 1008 of machine 1000 and downstream from post-form section 1500 in container-forming path direction X. In some embodiments, machine 1000 may also include a product load section (not shown) positioned downstream from outfeed section 1600 with respect to a container-discharge direction. Product load section is where a product is loaded into formed container 200, and container 200 is closed and sealed for shipping and/or storing the product. In the example embodiment, the container-discharge direction is in substantially the same direction as container-forming path direction X.

Machine 1000 includes a deck 1010 coupled to frame 1002 and configured to transfer blanks (e.g., blanks 10) from upstream end 1006 to downstream end 1008 and through each section 1100, 1200, 1400, 1500, and 1600. Machine 1000 further includes a plurality of protective panels 1012 coupled to frame 1002. Protective panels 1012 prevent external objects from interfering with operation of machine 1000. Protective panels 1012 may be made of plastic, glass, and/or any suitable material that facilitates protecting components of machine 1000. In the example embodiment, protective panels 1012 are substantially transparent, enabling an operator to visually monitor operation of machine 1000. Protective panels 1012, frame 1002, and certain elements of machine 1000 are omitted from FIGS. 4-10 for illustration.

Figure 4:
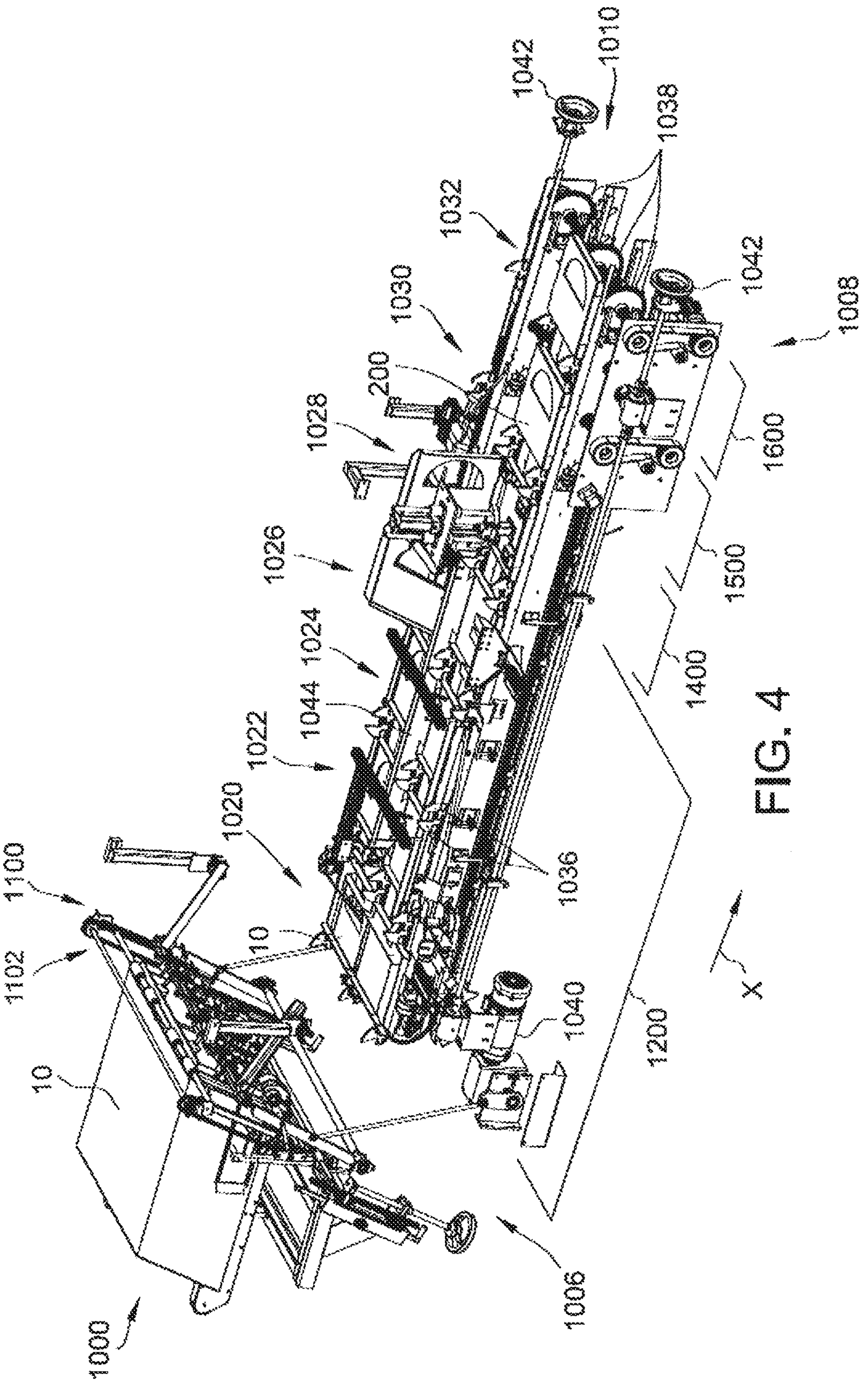
FIG. 4 is a perspective view of the formation of the container from a blank at each station of the machine shown in FIG. 3.

FIG. 4 shows an exemplary process of machine 1000 forming blank 10 (shown in FIG. 1) into container 200 (shown in FIG. 2). Blank transfer section 1100 includes a blank transfer assembly 1102. Pre-form section 1200 of machine 1000 includes a first station 1020, a second station 1022, a third station 1024, and a fourth station 1026. Mandrel section 1400 of machine 1000 includes a fifth station 1028. Post-form section 1500 of machine 1000 includes a sixth station 1030. Outfeed section 1600 of machine 1000 includes a seventh station 1032.

Blank transfer assembly 1102 is positioned at upstream end 1006 of machine 1000. First station 1020 is positioned downstream from blank transfer assembly 1102 in container-forming path direction X. Moreover, second station 1022 is positioned downstream from first station 1020 in container-forming path direction X, third station 1024 is positioned downstream from second station 1022 in container-forming path direction X, fourth station 1026 is positioned downstream from third station 1024 in container-forming path direction X, fifth station 1028 is positioned downstream from fourth station 1026 in container-forming path direction X, sixth station 1030 is positioned downstream from fifth station 1028 in container-forming path direction X, and seventh station 1032 is positioned at downstream end 1008 and is downstream from sixth station 1030 in container-forming path direction X. In the exemplary embodiment, pre-form section 1200, mandrel section 1400, post-form section 1500, and outfeed section 1600 are co-located adjacent to each other. This configuration enables a relatively shorter length of machine 1000. In other embodiments, pre-form section 1200, mandrel section 1400, post-form section 1500, and/or outfeed section 1600 may be separated from each other. For example, pre-form section 1200 and mandrel section 1400 may be separated from post-form section 1500 and outfeed section 1600 so that contents may be put in container 200 before container 200 is fully formed.

In the exemplary embodiment, machine 1000 is shown as having seven adjacent stations 1020, 1022, 1024, 1026, 1028, 1030, and 1032, and each station 1020, 1022, 1024, 1026, 1028, 1030, and 1032 folds blank 10 until container 200 is formed. In the exemplary embodiment, the seven adjacent stations 1020, 1022, 1024, 1026, 1028, 1030, and 1032 allow for a very fast folding of blank 10 into container 200, and machine 1000 makes approximately 25 containers 200 per minute. In other embodiments, certain stations may be combined, and there may be more space between the stations so that not all stations 1020, 1022, 1024, 1026, 1028, 1030, and 1032 are adjacent to one another. Further, the rate of making containers 200 may be faster or slower than the rate of machine 1000 in the exemplary embodiment.

In the exemplary embodiment, deck 1010 of machine 1000 includes lugs 1036 fixedly attached to respective chains 1038 that extend the length of and wrap around deck 1010. A servomechanism 1040 controls the speed at which chains 1038 move and, therefore, the speed and position of lugs 1036 with respect to deck 1010. For each blank 10, at least two lugs 1036 directly contact leading edge 16, and at least two lugs directly contact trailing edge 18. Trailing edge 18 of blank 10 is justified. That is, once trailing edge 18 of blank 10 is in contact with lugs 1036, trailing edge 18 and lugs 1036 remain in direct contact as blank 10 is formed into container 200 and moves through machine 1000. The spacing between the lugs 1036 contacting leading edge 16 and the lugs 1036 contacting trailing edge 18 of blank 10 can be manually adjusted using hand cranks 1042, or manually or automatically adjusted in any other suitable manner (e.g., via a servomechanism controlled using control system 1005), such that machine 1000 can accommodate any size, shape, and configuration of blank 10.

Further, in the exemplary embodiment, deck 1010 includes a bar 1044 that extends in container-forming path direction X and spans across second, third, and fourth stations 1022, 1024, and 1026. Bar 1044 is positioned and fixed with respect to deck 1010 and/or frame 1002 such that there is a space defined between bar 1044 and deck 1010 that is less than height $H_1$. In the exemplary embodiment, bar 1044 is shown as an I-shaped beam. In other embodiments, bar 1044 can be any suitable size and shape.

Figure 5:
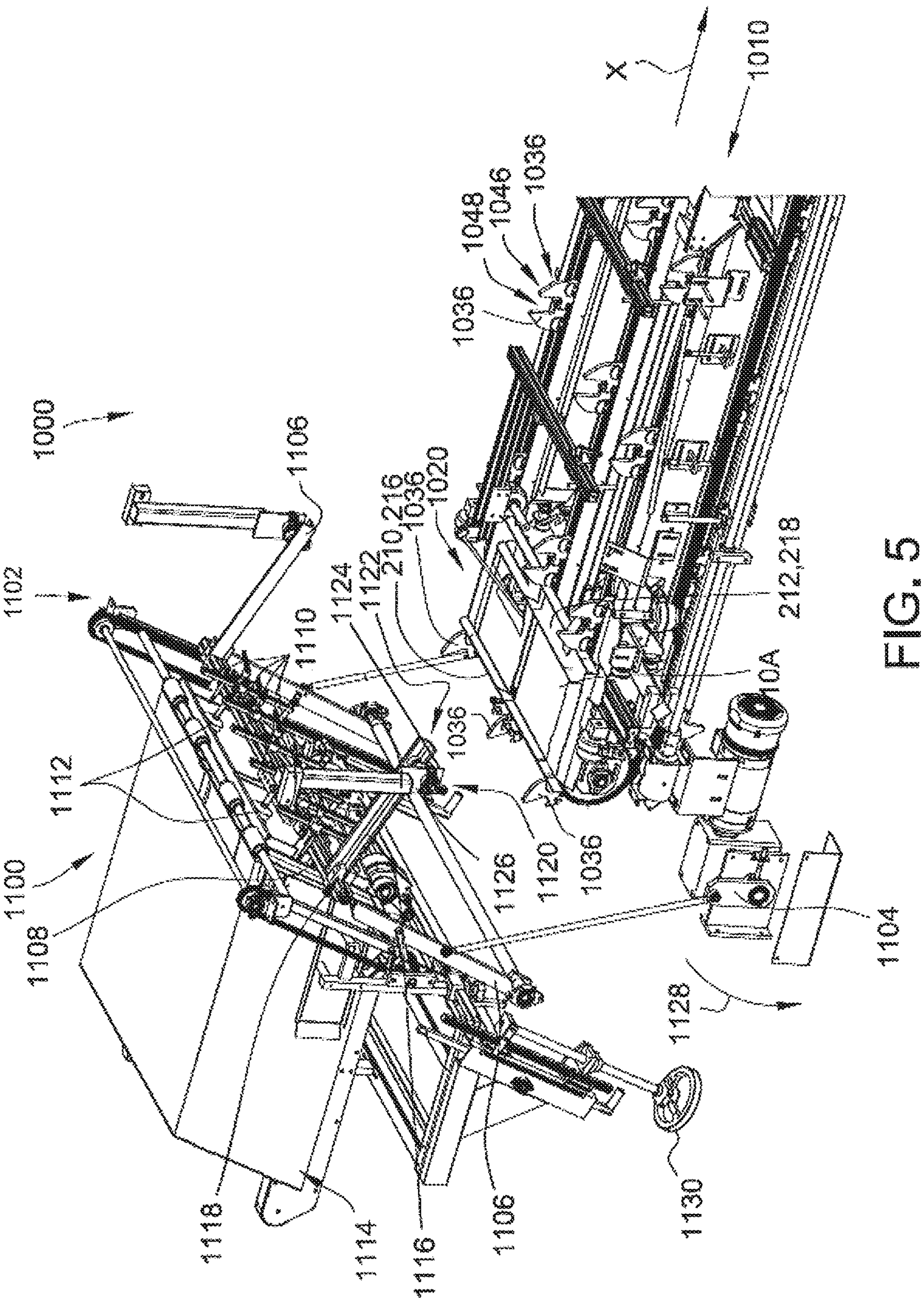
FIG. 5 is a perspective view of a blank in a first station of the machine shown in FIG. 4.

FIG. 5 shows a single blank 10 (shown in FIG. 1) in first station 1020 of machine 1000. Blank transfer assembly 1102 transfers blank 10 from blank transfer section 1100 to first station 1020 by placing blank 10 on deck 1010. More specifically, blank transfer assembly 1102 includes linear actuators 1104 operatively coupled to arms 1106 that are, in turn, pivotally coupled to a pick-up bar 1108. A plurality of pick-up arms 1110 are mounted to pick-up bar 1108, and a vacuum suction cup 1112 is fixedly coupled to each pick-up arm 1110. Suction cups 1112 are configured to retrieve a single blank 10 from the plurality of blanks 10 positioned within a magazine feed 1114. Suction cups 1112 include independent vacuum generators (not shown) for providing suction to attach suction cups 1112 to individual blanks 10. In an alternative embodiment, suction cups 1112 are attached to a centralized vacuum generator, which provides the vacuum for suction cups 1112 to attach to a blank 10. In the example embodiment, linear actuators 1104 are actuating cylinders that pneumatically transition between a first, "pick up" position (as linear actuators 1104 are shown in FIG. 5) and a second, "place" position (not shown).

An angle guide bar 1116 is fixedly coupled to pick-up bar 1108 at a first end 1118 of angle guide bar 1116, and is slidably and rotatably coupled to a pivot guide assembly 1120 at a second end 1122 of angle guide bar 1116. Angle guide bar 1116 and pivot guide assembly 1120 are operatively coupled to one another such that actuation of linear actuators 1104 causes pick-up bar 1108 to pivot and/or rotate a desired amount such that a blank 10 coupled to blank transfer section 1100 is aligned such that top panel 20, back panel 22, bottom panel 24, and front panel assembly 26 (shown in FIG. 1) are horizontal and generally flat when placed on deck 1010 at first station 1020. Pivot guide assembly 1120 includes a pivot guide mount 1124 fixedly coupled to frame 1002, and one or more pivot guides 1126 configured to slidably and/or rotatably engage angle guide bar 1116. In the example embodiment, angle guide bar 1116 is an L-bracket, and pivot guides 1126 are rollers positioned on opposite sides of a leg of the L-bracket.

In operation, linear actuators 1104 are operated and/or controlled to position suction cups 1112 to facilitate picking up a blank 10 from magazine feed 1114 and transferring blank 10 through blank transfer section 1100 to pre-form section 1200, and more specifically, to first station 1020 of pre-form section 1200. Linear actuators 1104 are actuated into the first position, causing suction cups 1112 to sealingly couple to a blank 10 within magazine feed 1114. Linear actuators 1104 are then actuated into the second position (not shown), causing arms 1106 to rotate in a first direction (generally, a downward or counter-clockwise direction with respect to the view of FIG. 5) indicated by arrow 1128, which in turn cause angle guide bar 1116 to slidably and rotatably engage pivot guide assembly 1120, which in turn causes pick-up bar 1108 and pick-up arms 1110 to rotate in a second direction (generally an upward or clockwise direction with respect to the view of FIG. 5) generally opposite to the first direction 1128. The general motion of pick-up bar 1108 and pick-up arms 1110 is movement along an arc in first, generally counter-clockwise direction 1128 while rotating in the second, generally clockwise direction opposite the first direction 1128. Suction cups 1112 follow the general motion of pick-up arms 1110, and release blank 10 onto deck 1010 at first station 1020. Once blank 10 is released, the direction of linear actuators 1104 is reversed to move suction cups 1112 to their original position to pick up the next blank 10. In the exemplary embodiment, the vertical position of blank transfer assembly 1102, and therefore, the horizontal position of blank transfer assembly 1102 when in contact with deck 1010, can be manually adjusted using a hand crank 1130. In other embodiments, the vertical/horizontal position of blank transfer assembly 1102 can be automatically adjusted based on the size of a blank 10 using, for example, a sensor and a motor. Blank transfer assembly 1102 may include any suitable structure and/or means that may be used to attach to blank 10 and transfer blank 10 from magazine feed 1114 to first station 1020 of pre-form section 1200 without departing from the scope of the present disclosure.

In the exemplary embodiment, as blank transfer assembly 1102 transfers blank 10 to deck 1010, respective pairs or sets of lugs 1036 contact leading edge 16 and trailing edge 18 of blank 10. Lugs 1036 have a curved wedge-shape on a top 1046 thereof that transitions to a generally vertical, flat face 1048 on a bottom thereof. Tops 1046 of lugs 1036 contact exterior surface 14 of first top and bottom side panels 34 and 52 and second top and bottom side panels 36 and 54 as blank 10 is pushed down by blank transfer assembly 1102 to deck 1010. The shape of the lugs 1036 and the force of blank transfer assembly 1102 pushing blank 10 toward deck 1010 cooperate to cause first top and bottom side panels 34 and 52 and second top and bottom side panels 36 and 54 to rotate inwardly (e.g., towards interior surface 12 of blank 10) and form first lid and tray side walls 210 and 216 and second lid and tray side walls 212 and 218, respectively. That is, first top side panel 34 is forced to rotate about (that is, is folded along) fold line 38 to form first lid side wall 210 of container 200, second top side panel 36 is forced to rotate about (that is, is folded along) fold line 40 to form second lid side wall 212 of container 200, first bottom side panel 52 is forced to rotate about (that is, is folded along) fold line 56 to form first tray side wall 216 of container 200, and second bottom side panel 54 is forced to rotate about (that is, is folded along) fold line 58 to form second tray side wall 218 of container 200. Top side panels 34 and 36 are folded at a substantially 90-degree angle relative to top panel 20, and bottom side panels 52 and 54 are folded at a substantially 90-degree angle relative to bottom panel 24 such that lid side walls 210 and 212 are generally perpendicular to top wall 242 of container 200 and tray side walls 216 and 218 are generally perpendicular to bottom wall 240 of container 200. In this arrangement, blank 10 is referred to as a partially formed container 10A.

Figure 6:
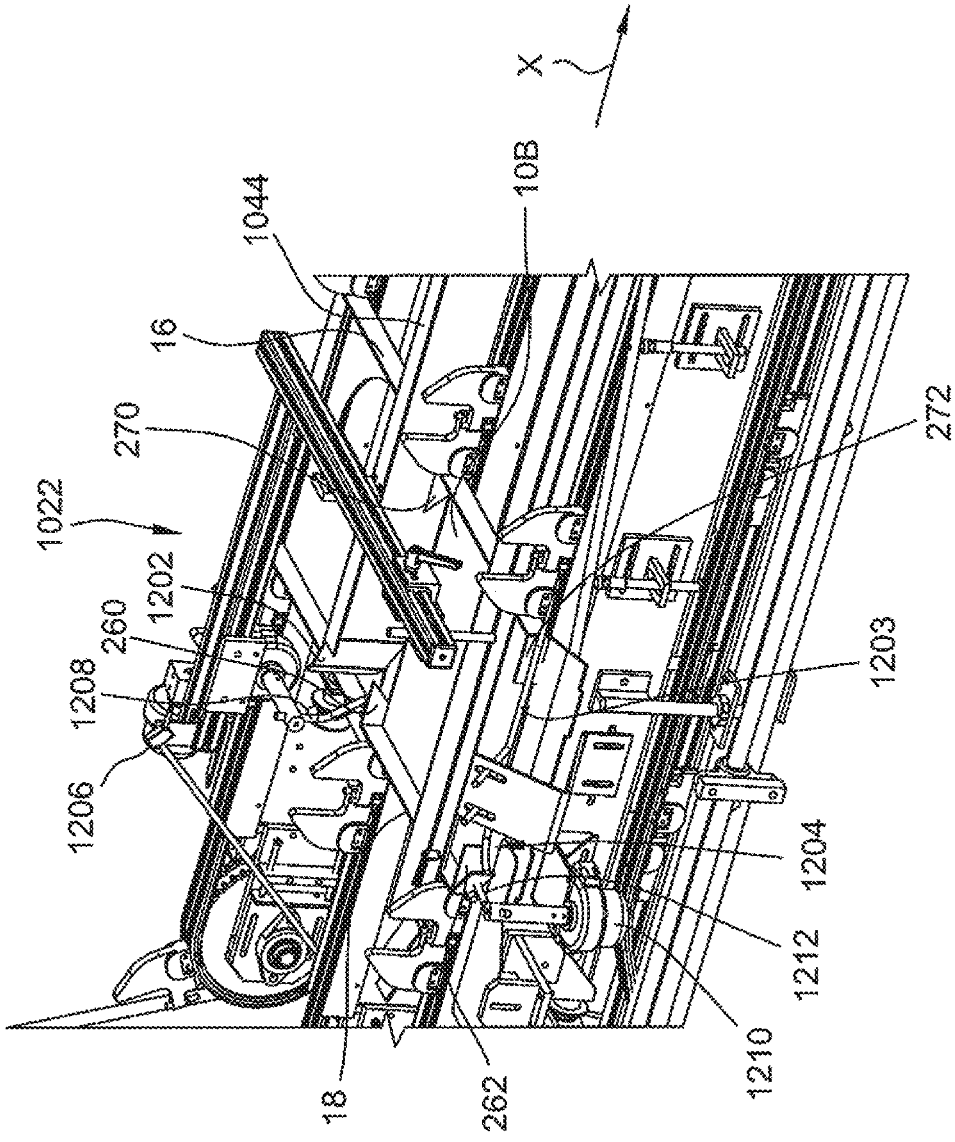
FIG. 6 is a perspective view of the blank shown in FIG. 5 in a second station of the machine shown in FIG. 4.

FIG. 6 shows blank 10, now partially formed container 10A, in second station 1022 of machine 1000. As partially formed container 10A is transferred in container-forming path direction X (by chains 1038 and lugs 1036) from first station 1020 to second station 1022, back panel 22 (shown in FIG. 1) of partially formed container 10A slides under bar 1044. Bar 1044 is configured to keep back panel 22 of partially formed container 10A justified through pre-form section 1200. That is, bar 1044 keeps back panel 22 of partially formed container 10A centered until back panel 22 reaches mandrel section 1400. Further, as partially formed container 10A is transferred in container-forming path direction X from first station 1020 to second station 1022, a second glue sub-wall 270, a first glue sub-wall 260, a second tuck sub-wall 272, and a first tuck sub-wall 262 are formed by folding panels 70, 60, 72, and 62, respectively, of blank 10 (panels shown in FIG. 1).

Specifically, in first station 1020, when bottom side panels 52 and 54 are folded and rotated about fold lines 56 and 58, respectively, as described above, glue panels 60 and 70, which extend from bottom side panels 52 and 54, are simultaneously rotated such that glue panels 60 and 70 are vertically oriented, or oriented at a substantially 90-degree angle relative to bottom panel 24. Likewise, tuck panels 62 and 72, which extend from bottom side panels 52 and 54, are also simultaneously rotated such that tuck panels 62 and 72 are vertically oriented, or oriented at a substantially 90-degree angle relative to bottom panel 24. As partially formed container 10B is transferred from first station 1020 to second station 1022, an extension 1202 of bar 1044 and an extension 1204 of a stationary rod 1203 (fixedly coupled to frame 1002 and/or deck 1010) contact exterior surface 14 of the vertically oriented second glue panel 70 and second tuck panel 72, respectively. Extensions 1202 and 1204 are curved such that extensions 1202 and 1204 contact and begin to rotate second glue panel 70 and second tuck panel 72, respectively, about fold lines 74 and 76, respectively, as blank 10 is moved in container-forming path direction X and second glue panel 70 and second tuck panel 72 are forced against extensions 1202 and 1204, respectively. As second glue panel 70 is forced against extension 1202 and rotated about fold line 74, second glue panel 70 begins to form second glue sub-wall 270. Likewise, as second tuck panel 72 is forced against extension 1204 and rotated about fold line 76, second tuck panel 72 begins to form second tuck sub-wall 272, respectively. Extension 1202 and extension 1204 are generally aligned with each other or in the same position with respect to container-forming path direction X and are generally curved in the same shape such that second glue panel 70 and second tuck panel 72 are folded substantially simultaneously.

Once partially formed container 10A is transferred a predetermined distance along container-forming path direction X, leading edge 16 of partially formed container 10B is translated past extensions 1202 and 1204. Bar 1044 is straight or linear beyond extension 1202, and stationary rod 1203 is straight or linear beyond extension 1204. Accordingly, as second glue panel 70 and second tuck panel 72 contact the linear portions of bar 1044 and stationary rod 1203, respectively, second glue panel 70 and second tuck panel 72 are sufficiently folded to form second glue sub-wall 270 and second tuck sub-wall 272, respectively. That is, second glue panel 70 and second tuck panel 72 are folded such that each of second glue sub-wall 270 and second tuck sub-wall 272 are generally perpendicular to second tray side wall 218.

Subsequently, once partially formed container 10A is transferred along container-forming path direction X for a predetermined distance (e.g., leading edge 16 of partially formed container 10B is moved past extensions 1202 and 1204 and/or trailing edge 18 reaches a predetermined location along deck 1010), hooks 1208 and 1212 are activated. Specifically, hook 1208 is coupled to a rotary actuator 1206, and hook 1212 is coupled to a rotary actuator 1210. Rotary actuators 1206 and 1210 are actuated (e.g., by control system 1005, shown in FIG. 3), which causes hooks 1208 and 1212, respectively, to pivot and contact exterior surface 14 of the vertically oriented first glue panel 60 and first tuck panel 62, respectively. Specifically, hook 1208 pivots into contact with first glue panel 60 and forces first glue panel 60 to rotate about fold line 64. Likewise, hook 1212 pivots into contact with first tuck panel 62 and forces first tuck panel 62 to rotate about fold line 66. As first glue panel 60 is rotated, first glue panel 60 forms first glue sub-wall 260. Likewise, as first tuck panel 62 is rotated, first tuck panel 62 forms first tuck sub-wall 262. That is, the rotation of hooks 1208 and 1212 against first glue panel 60 and first tuck panel 62 folds first glue panel 60 and first tuck panel 62, respectively, such that first glue sub-wall 260 and first tuck sub-wall 262 are each generally perpendicular to first tray side wall 216.

Hooks 1208 and 1212 are generally aligned with each other or in the same position with respect to container-forming path direction X, and actuators 1206 and 1210 are generally activated simultaneously such that first glue panel 60 and first tuck panel 62 are folded substantially simultaneously. Actuators 1206 and 1210 may include sensors that activate actuators 1206 and 1210 as leading edge 16 moves past actuators 1206 and 1210 and/or actuators 1206 and 1210 may be on a timer that corresponds to the pace of partially formed container 10B being transferred through second station 1022 (e.g., based on a speed of chains 1038 and/or lugs 1036).

Bar 1044 is positioned such that glue sub-walls 260 and 270 are maintained in contact thereagainst, such that glue sub-walls 260 and 270 are maintained in their folded or rotated orientation with respect to tray side walls 216 and 218, as partially formed container 10B is transferred along container-forming path direction X to third station 1024. Likewise, rod 1203 is positioned such that tuck sub-walls 262 and 272 are maintained in contact thereagainst, such that tuck sub-walls 262 and 272 are maintained in their folded or rotated orientation with respect to tray side walls 216 and 218, as partially formed container 10B is transferred along container-forming path direction X from second station 1022 to third station 1024.

In the exemplary embodiment, rod 1203 is stationary, such that no extra motors or actuators are needed to facilitate the folding function of rod 1203. In alternative embodiments, rod 1203 may not be curved and/or stationary, but may be controlled by a motor or actuator to rotate, pivot, translate, and/or otherwise move with partially formed container 10B as partially formed container 10A is transferred through second station 1022 and forms partially formed container 10B.

In this arrangement (i.e., partially formed container 10B including glue sub-walls 260 and 270 and tuck sub-walls 262 and 272), blank 10 is referred to as partially formed container 10B.

Figure 7:
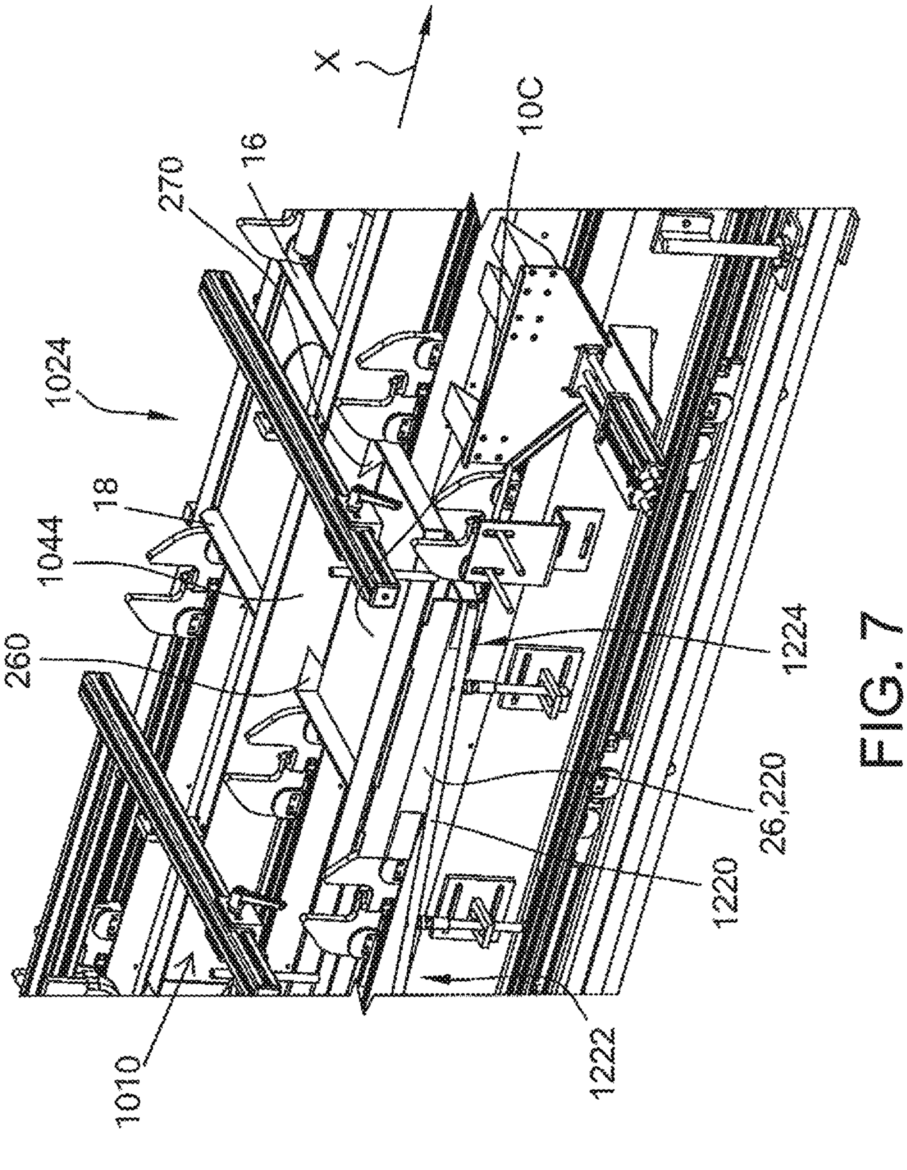
FIG. 7 is a perspective view of the blank shown in FIG. 6 in a third station of the machine shown in FIG. 4.

FIG. 7 shows partially formed container 10B of FIG. 6 in third station 1024 of machine 1000. As partially formed container 10B is transferred from second station 1022 to third station 1024 via chains 1038 and/or lugs 1036, tray front wall 220 of container 200 is partially formed by folding front panel assembly 26 of blank 10 about fold line 32 (shown in FIG. 1). Specifically, an angled, stationary rod 1220 (coupled to frame 1002 and/or deck 1010) is angled in such a way that a first end 1222 of rod 1220 is further from deck 1010 than a second end 1224 of rod 1220. That is, rod 1220 is angled toward deck 1010 along the container-forming path direction X. Accordingly, first end 1222 of rod 1220 contacts front panel assembly 26 at leading edge 16 thereof. Front panel assembly 26 is forced against first end 1222 of rod 1220 such that begins to fold front panel assembly 26 along fold line 32. As partially formed container 10B moves through third station 1024, front panel assembly 26 is forced against rod 1220 as front panel assembly 26 passes from first end 1222 of rod 1220 to second end 1224 of rod 1220, and the engagement of front panel assembly 26 with angled rod 1220 folds front panel assembly 26 along fold line 32. As such, front panel assembly 26 partially forms tray front wall 220. That is, rod 1220 folds front panel assembly 26 until front panel assembly 26 is perpendicular to bottom panel 24 and until front panel assembly 26 is coupled against tuck sub-walls 262 and 272 (shown in FIG. 6).

In the exemplary embodiment, like rod 1203 of second station 1022 (shown in FIG. 5), rod 1220 is stationary, such that no extra motors or actuators are needed to facilitate the folding function of rod 1220. In alternative embodiments, rod 1220 may not be curved and/or stationary, but may be controlled by a motor or actuator to rotate, pivot, translate, and/or otherwise move with partially formed container 10B as partially formed container 10B is transferred through third station 1024 and forms partially formed container 10C.

In this arrangement (i.e., partially formed container 10B having a partially formed lid 202 and a partially formed tray 204 with a partially formed tray front wall 220), blank 10 is referred to as a partially formed container 10C.

Figure 8A:
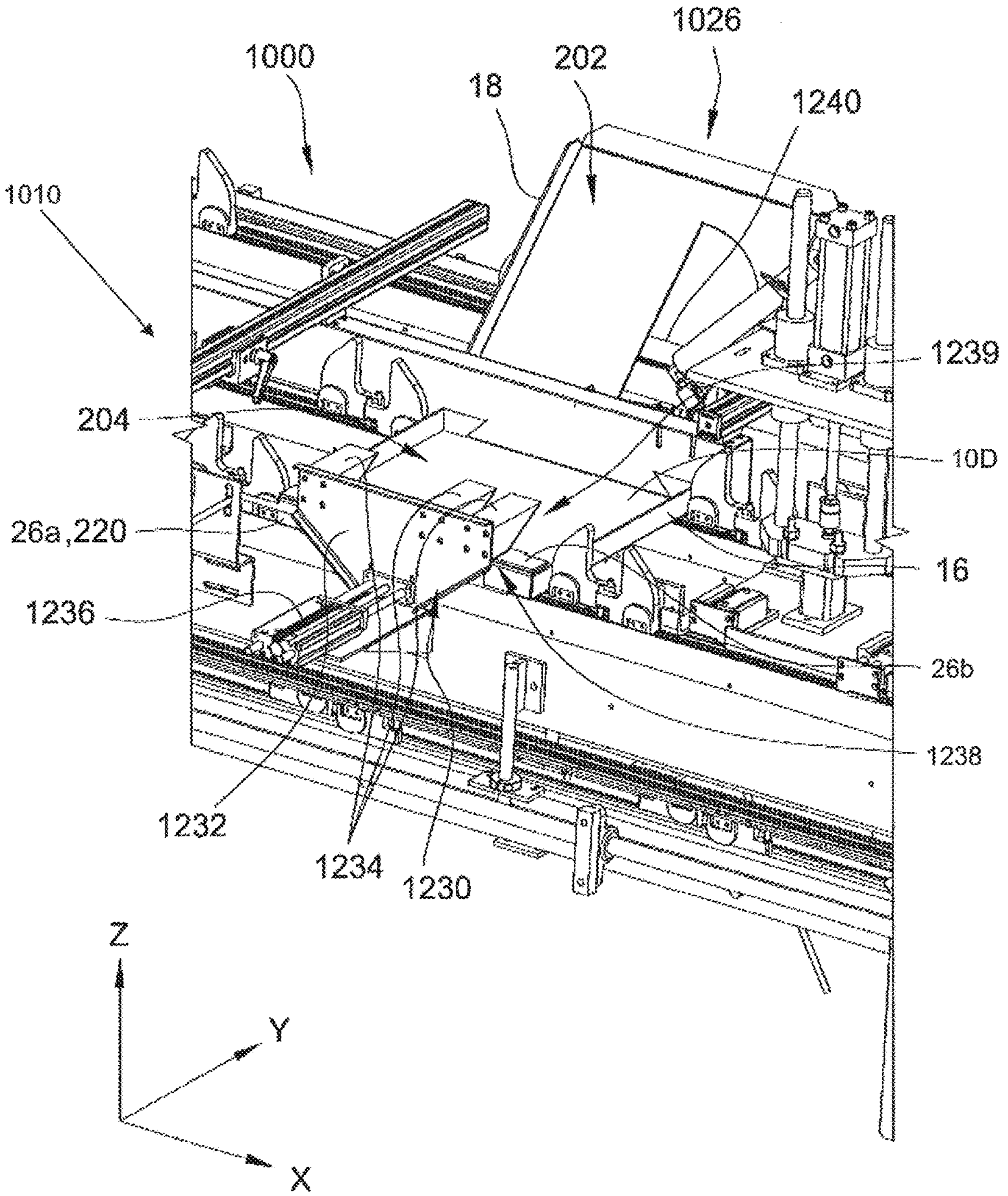
FIG. 8A is a front perspective view of the blank shown in FIG. 7 in a fourth station of the machine shown in FIG. 4.
Figure 8B:
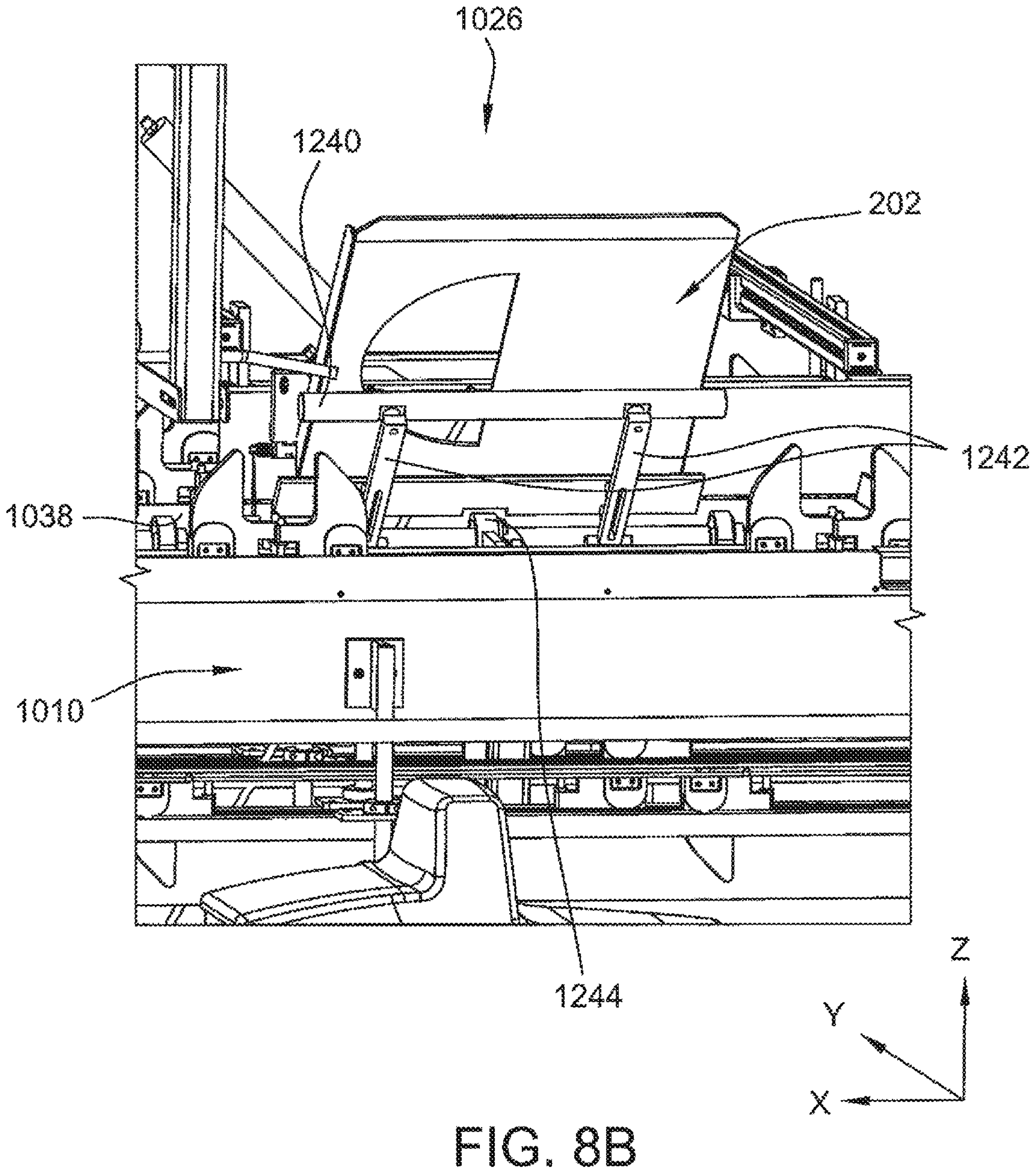
FIG. 8B is a back perspective view of the blank shown in FIG. 7 in the fourth station of the machine shown in FIG. 4.

FIGS. 8A and 8B show partially formed container 10C of FIG. 7 in fourth station 1026 of machine 1000. In fourth station 1026, tray front wall 220 of container 200 (shown in FIG. 2) is further formed, and partially formed lid 202 is partially folded with respect to partially formed tray 204.

Fourth station 1026 includes a push mechanism 1230 including a push plate 1232 with a plurality of wedges 1234 mounted thereto is controlled by a servomechanism 1236. Push mechanism 1230 is configured to further form tray front wall 220 by folding roll-over panel **26*b* along fold line 33 such that roll-over panel 26*b* is perpendicular to front panel 26*a* and parallel to bottom panel 24 of partially formed tray 204. More specifically, servomechanism 1236 is activated to translate push mechanism 1230 forward in a generally lateral direction Y. A generally flat bottom edge 1238 of each wedge 1234 is substantially aligned, in a generally vertical direction Z, with fold line 33, and an angled surface 1239 of each wedge 1234 extends at an angle from each respective bottom edge 1238. Accordingly, as push mechanism 1230 is translated in the lateral direction Y, angled surfaces 1239 contact exterior surface 14 of roll-over panel 26***b*. As push mechanism 1230 is further advanced, wedge 1234 force roll-over panel 26*b* to rotate about fold line 33 until roll-over panel 26*b* is generally perpendicular to front panel 26*a*.

Further, in the exemplary embodiment, fourth station 1026 further includes a push bar 1240 mounted on a pair of arms 1242 that are controlled by an actuator 1244. Push bar 1240 is configured to partially fold partially formed lid 202 along fold line 28 toward partially formed tray 204, to an angle less than 90 degrees relative to partially formed tray 204. More specifically, when partially formed container 10C is transferred into fourth station 1026 (by lugs 1036 and/or chains 1038), push bar 1240 is in a first, retracted or unadvanced state, such that push bar 1240 is generally parallel to deck 1010 and is below chains 1038 with respect to vertical direction Z.

Once partially formed container 10C is positioned at fourth station 1026, actuator 1244 activates to advance push bar 1240 upwards. More specifically, actuator 1244 is rotatably coupled to arms 1242, which are in turn coupled to push bar 1240. When actuator 1244 is activated, actuator 1244 rotates arms 1242 such that arms 1242 pivot about a pivot axis and advance push bar 1240 along an arcuate, inward and upward path. As push bar 1240 is advanced, push bar 1240 contacts exterior surface 14 of top panel 20, which forces partially formed lid 202 and back panel 22 to rotate together about fold line 30 toward partially formed tray 204 until partially formed lid 202 and back panel 22 are at a predefined angle less than 90 degrees relative to partially formed tray 204 (while partially formed lid 202 and back panel 22 remain parallel to one another).

In the example embodiment, push bar 1240 rotates partially formed lid 202 and back panel 22 about fold line 30 until partially formed lid 202 and back panel 22 are at a predetermined angle of about 45 degrees relative to partially formed tray 204. In such an embodiment, partially formed lid 202 and back panel 22 are rotated to the predetermined angle to keep glue sub-walls 260 and 270 folded, because bar 1044 terminates at fourth section 1026. That is, free ends of lid side walls 210 and 212 may contact glue sub-walls 260 and 270 once partially formed container 10C is advanced past the end of bar 1044, and may facilitate maintaining glue sub-walls 260 and 270 in their folded orientation. In other embodiments, the predetermined angle of partially formed lid 202 and back panel 22 relative to partially formed tray 204 may be any angle less than or equal to 90 degrees. Further, in other embodiments, push bar 1240 may not be included in fourth station 1026. That is, in alternative embodiments, partially formed lid 202 and/or back panel 22 may not be pre-folded with respect to partially formed tray 204 in a station upstream of mandrel section 1400.

Actuator 1244 and/or servomechanism 1236 may include sensors that activate actuator 1244 and/or servomechanism 1236 as detect when leading edge 16 moves past actuator 1244 and/or servomechanism 1236, and/or actuator 1244 and/or servomechanism 1236 may be on a timer that corresponds to the pace of partially formed container 10C going through fourth station 1026 (e.g., based on a speed of chains 1038 and/or lugs 1036). Further, in other embodiments, push mechanism 1230 and/or push bar 1240 may be replaced by stationary rods or bars like those shown in FIGS. 6 and 7.

In this arrangement (i.e., partially formed container 10C having further partially formed tray front wall 220 and partially formed lid 202 being partially folded at a predetermined angle relative to partially formed tray 204), blank 10 is referred to as a partially formed container 10D.

Figure 9A:
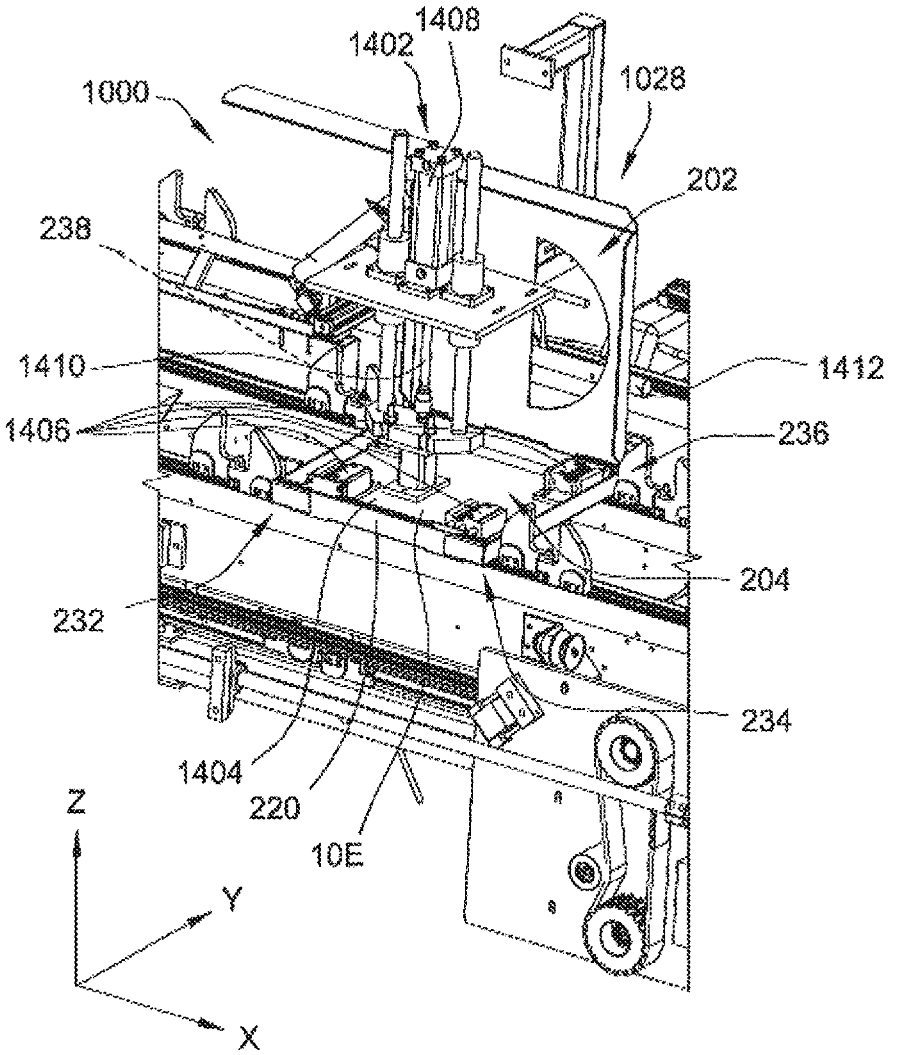
FIG. 9A is a front perspective view of the blank shown in FIG. 8 in a fifth station of the machine shown in FIG. 4.
Figure 9B:
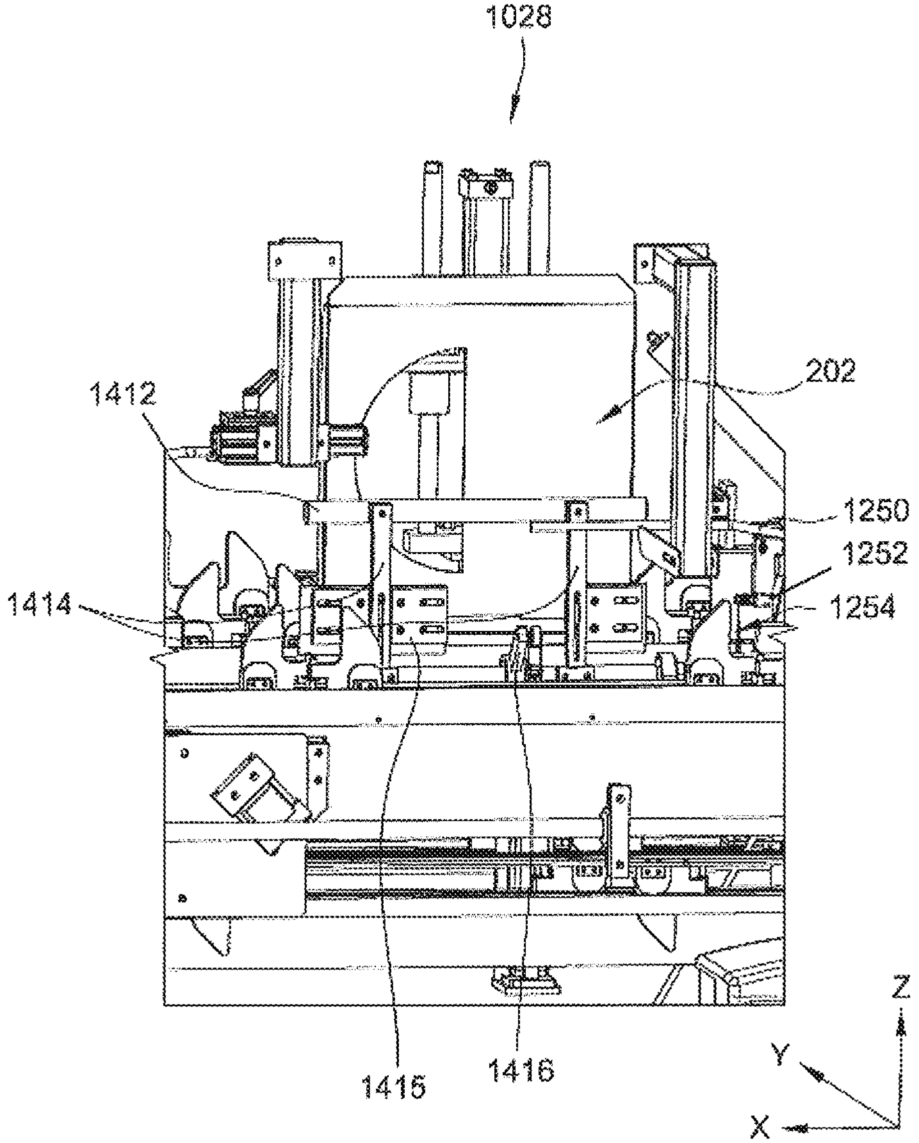
FIG. 9B is a back perspective view of the blank shown in FIG. 8 in the fifth station of the machine shown in FIG. 4.

FIGS. 9A and 9B show partially formed container 10D of FIG. 8 in fifth station 1028 of machine 1000, that is, in mandrel section 1400. Fifth station 1028 includes a curved rod 1250 positioned to contact exterior surface 14 of top panel 20 as partially formed container 10D is translated from fourth station 1026 to fifth station 1028 (by lugs 1036 and/or chains 1038). Curved rod 1250 is configured to maintain the angled position of partially formed lid 202 and back panel 22 (i.e., to keep partially formed lid 202 and back panel 22 at the predetermined angle relative to partially formed tray 204). Further, as partially formed container 10D is translated from fourth station 1026 to fifth station 1028, an adhesive applicator 1252 is activated to spray adhesive 1254 to interior surface 12 of back panel 22 in regions that correspond to glue sub-walls 260 and 270 and/or to exterior surface 14 of glue panels 60 and 70.

In fifth station 1028, tray 204 is fully formed, and partially formed lid 202 and back panel 22 are further rotated with respect to tray 204, to a position such that back panel 22 and partially formed lid 202 are generally perpendicular to tray 204.

Fifth station 1028 includes a mandrel assembly 1402 configured to fully form tray 204. Mandrel assembly 1402 includes a mandrel plate 1404 and a plurality of compression members 1406 coupled to mandrel plate 1404 at each corner of mandrel plate 1404. A servomechanism 1408 controls vertical movement of mandrel assembly 1402 along vertical direction Z, and a plurality of actuators 1410 control translational movement of compression members 1406 along lateral direction Y.

To fully form tray 204, mandrel assembly 1402 is translated downward until mandrel plate 1404 is positioned above bottom panel 24 (shown in FIG. 1). As mandrel plate 1404 is translated downward, along vertical direction Z, a bottom surface (not specifically shown) of mandrel plate 1404 engages exterior surface 14 of roll-over panel 26*b*, and subsequently forces roll-over panel 26*b* to rotate inwardly, toward interior surface 12 of front panel 26*a*, along fold line 33. As roll-over panel 26*b* is folded, tuck sub-walls 262 and 272 are fixedly positioned between roll-over panel 26*b* and front panel 26*a*, such that front panel 26*a*, tuck sub-walls 262 and 272, and roll-over panel 26*b* together form tray front wall 220. As described with respect to FIG. 2, tray front wall 220 and first tray side wall 216 form first tray corner 232, and tray front wall 220 and second tray side wall 218 form second tray corner 234.

Fifth station 1028 also includes a push bar 1412 coupled to arms 1414, which are in turn rotatably coupled to an actuator 1416. A push plate 1415 is also coupled to arms 1414, between push bar 1412 and actuator 1416. When actuator 1416 is activated, actuator 1416 rotates arms 1414 such that arms 1414 pivot about a pivot axis and advance push bar 1412 and push plate 1415 along an arcuate, inward and upward path. As push bar 1412 is advanced, push bar 1412 contacts exterior surface 14 of top panel 20. Simultaneously, as push plate 1415 is advanced, push plate 1415 contacts exterior surface of back panel 22. Push bar 1412 and push plate 1415 operate cooperative to further rotate back panel 22 and partially formed lid 202 about fold line 30 until back panel 22 and partially formed lid 202 are substantially perpendicular to bottom panel 24 of tray 204 (while partially formed lid 202 and back panel 22 remain parallel to one another). As back panel 22 is rotated into the perpendicular orientation with respect to tray 204, back panel 22 couples to glue sub-walls 260 and 270, and adhesive 1254 of back panel 22 bonds back panel 22 to glue sub-walls 260 and 270. Accordingly, back panel 22 and glue sub-walls 260 and 270 together form back wall 206 of container 200. As described above with respect to FIG. 2, back wall 206 and second tray side wall 218 form third tray corner 236, and back wall 206 and first tray side wall 216 from fourth tray corner 238. In the exemplary embodiment, mandrel assembly 1402 forms front wall 220 of tray 204 and forms tray corners 232, 234, 236, and 238 in the same operation. That is, mandrel assembly 1402 forms front wall 220 of tray 204 and tray corners 232, 234, 236, and 238 at substantially the same time.

Once back wall 206 is formed, compression members 1406 adjacent back wall 206 are activated to compress glue sub-walls 260 and 270 against back panel 22 to ensure back panel 22 is securely bonded with glue sub-walls 260 and 270. Specifically, actuators 1410 are activated to translate the compression members 1406 adjacent back wall 206 generally rightward along lateral direction Y, with respect to the view of FIG. 9A, to compress glue sub-walls 260 and 270 against back panel 22. In some embodiments, push plate 1415 is maintained in its fully advanced position, such that push plate 1415 delivers an opposing compression force to compression members 1406.

Further, once tray front wall 220 is formed, compression members 1406 adjacent tray front wall 220 are activated to compress roll-over panel **26*b* against front panel 26*a* and/or tuck panels 62 and 72 to force tabs 84 (shown in FIG. 1) of roll-over panel 26*b* into tab cut-outs 82 (shown in FIG. 1) of bottom panel 24. Tabs 84 and tab cut-outs 82 interlock such that roll-over panel 26*b* does not need adhesive to stay in place. In the example embodiment, actuators 1410 are activated to translate the compression members 1406 adjacent tray front wall 220 to generally leftward along lateral direction Y, with respect to the view of FIG. 9A, to compress roll-over panel 26*b* against front panel 26*a* and/or tuck panels 62 and 72. In some embodiments, all actuators 1410 activate all compression members 1406 simultaneously. In other embodiments, compression members 1406** may be activated other than simultaneously.

In this arrangement (i.e., partially formed container 10D having formed tray 204, and partially formed lid 202 and back wall 206 being perpendicular to tray 204), blank 10 is referred to as a partially formed container 10E.

Figure 10:
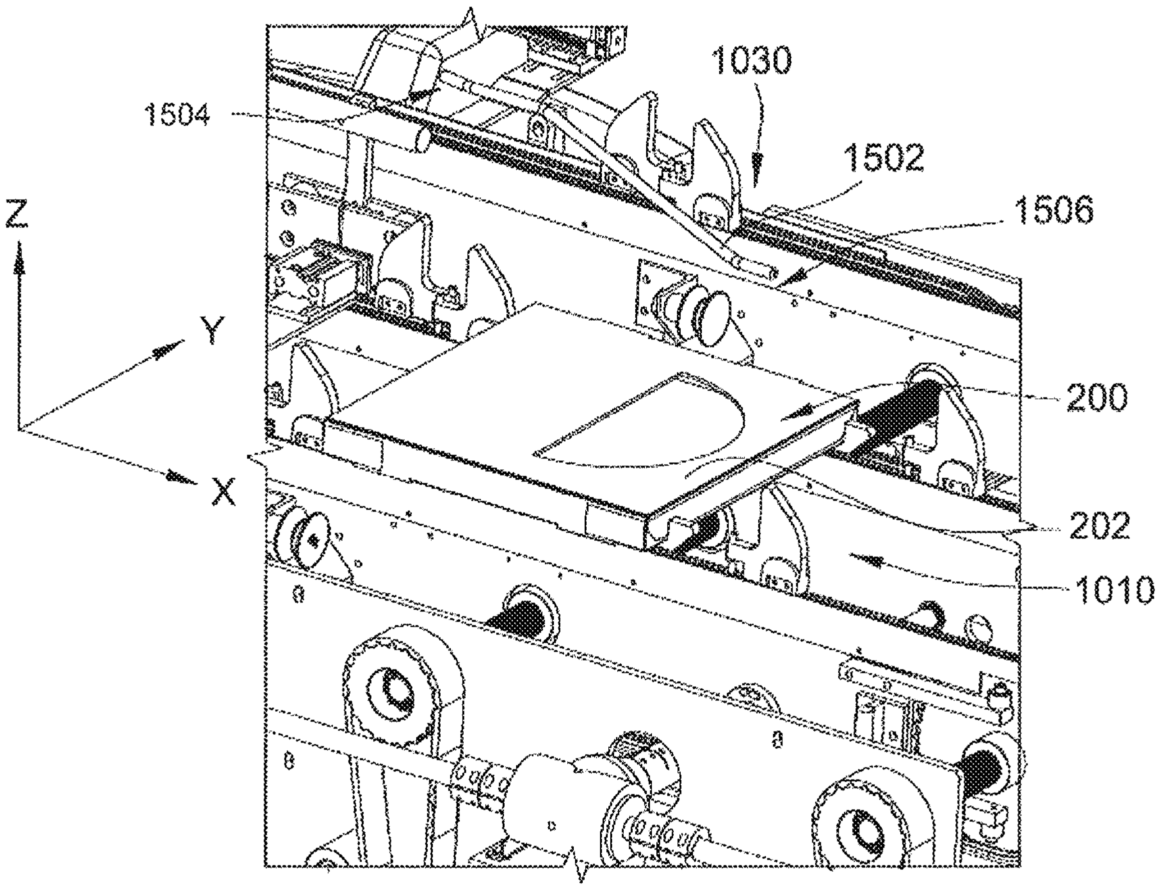
FIG. 10 is a perspective view of the blank shown in FIG. 9 in a sixth station of the machine shown in FIG. 4.

FIG. 10 show partially formed container 10E of FIGS. 9A and 9B in sixth station 1030 of machine 1000, that is, in post-form section 1500. As partially formed container 10E is transferred from fifth station 1028 to sixth station 1030 (via chains 1038 and/or lugs 1036), container 200 is formed therefrom, by folding lid 202 to couple to tray 204. Specifically, sixth station 1030 includes a forming assembly (i.e., an angled, stationary rod 1502) coupled to frame 1002 and/or deck 1010. Rod 1502 is angled both vertically and laterally. That is, rod 1502 is angled downwardly along vertical direction Z and inwardly (e.g., towards a middle of deck 1010) along lateral direction Y, with respect to the view of FIG. 10. Therefore, a first or upstream end 1504 of rod 1502 is further from deck 1010 than a second end or downstream 1506 of rod 1502, such that rod 1502 is considered to be angled toward deck 1010 as rod 1502 extends in the container-forming path direction X. Accordingly, first end 1504 of rod 1502 contacts partially formed lid 202 as partially formed container 10E is translated along the container-forming path direction X. Partially formed lid 202 is forced against first end 1504 of rod 1502 such partially formed lid 202 begins to fold along fold line 30 and rotate inwardly towards tray 204. As partially formed container 10E moves through sixth station 1030, partially formed lid 202 is forced downward toward tray 204 as lid 202 contacts rod 1502 from first end 1504 to second end 1506 of rod 1502. Once lid 202 is fully engaged with tray 204, container 200 is formed. That is, rod 1502 folds lid 202 until lid 202 is perpendicular to back wall 206 and parallel to tray 204, such that lid 202 is coupled to tray 204. In the exemplary embodiment, rod 1502 is considered the post-form assembly.

In the exemplary embodiment, like rods 1203 and 1220 of second station 1022 (shown in FIG. 5) and third station 1024 (shown in FIG. 6), respectively, rod 1502 is stationary, such that no extra motors or actuators are needed to facilitate the folding function of rod 1502. In alternative embodiments, rod 1502 may not be curved and/or stationary, but may be controlled by a motor or actuator to rotate, pivot, translate, and/or otherwise move with partially formed container 10E as partially formed container 10E is transferred through sixth station 1030 to form container 200.

Although not specifically shown, post-form section 1500 can include components configured to further fold and/or bond one or more panels of container 200. For example, in the exemplary embodiment, top front panel 42 is not folded by machine 1000 and is folded manually after container 200 goes through machine 1000. In alternative embodiments, post-form section 1500 includes rod or push bar configured to fold top front panel 42 about fold line 44 and into engagement with exterior surface 14 of front panel **26*a* of front panel assembly 26 (that is, exterior surface 14 of tray front wall 220**).

Figure 11:
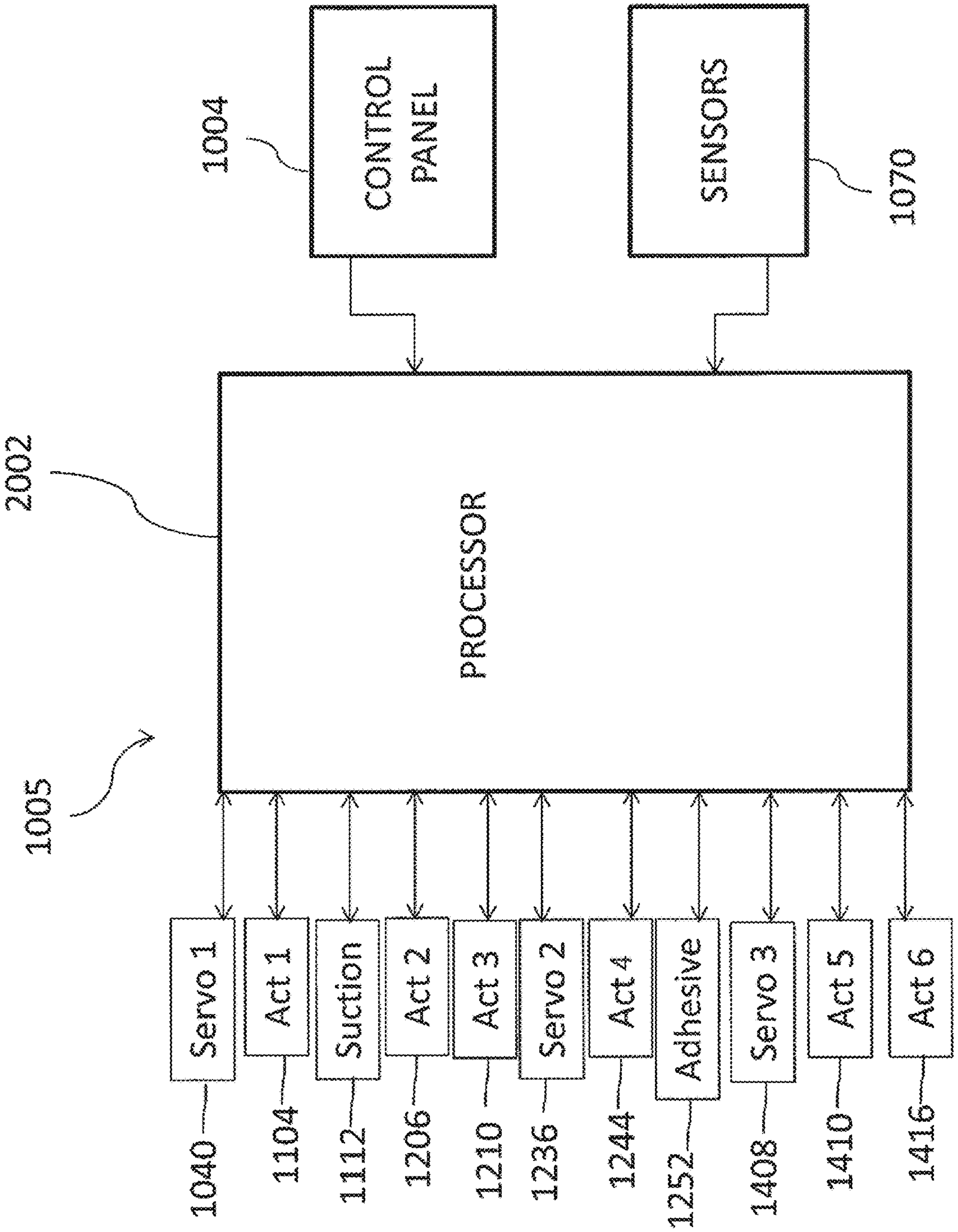
FIG. 11 is a schematic block diagram of an example control system that may be used with the machine shown in FIG. 3.

FIG. 11 shows a schematic block diagram of an example control system 1005 of machine 1000. In the example embodiment, control system 1005 includes at least control panel 1004, a processor 2002, and sensors 1070. In certain embodiments, preprogrammed recipes or protocols embodied on a non-transitory computer-readable medium are programmed in and/or uploaded to processor 2002 and such recipes include, but are not limited to, predetermined speed and timing profiles, wherein each profile is associated with forming containers from blanks having a predetermined size and shape.

In the example embodiment, one or more actuators 1104, 1206, 1210, 1244, 1410, and 1416, adhesive applicator 1252, servomechanisms 1040, 1236, and 1408, and suction cups 1112 are integrated with machine control system 1005, and that control system 1005 is configured to transmit signals to each control in operation.

In certain embodiments, control system 1005 is configured to facilitate selecting a speed and/or timing of the movement and/or activation of the devices and/or components associated with each of actuators 1104, 1206, 1210, 1244, 1410, and 1416, adhesive applicator 1252, servomechanisms 1040, 1236, and 1408, and suction cups 1112. The devices and/or components may be controlled either independently or as part of one or more linked mechanisms. For example, in embodiments where one or more of actuators 1104, 1206, 1210, 1244, 1410, and 1416 is a servomechanism, the speed and timing of each such actuator can be controlled independently as commanded by control system 1005.

In certain embodiments, control panel 1004 allows an operator to select a recipe for use by control system 1005 that is appropriate for a particular blank and/or container. The operator typically does not have sufficient access rights/capabilities to alter the recipes, although select users can be given privileges to create and/or edit recipes. Each recipe is a set of computer instructions that instruct machine 1000 as to forming the container 200 (shown in FIG. 2). For example, machine 1000 is instructed as to speed and timing of picking a blank from magazine feed 1114 and speed and timing of each blank 10 (shown in FIG. 1) translating through each station 1020, 1022, 1024, 1026, 1028, 1030, and 1032. In embodiments where one or more actuators is a servomechanism, control system 1005 is able to control the movement of each such actuator independently relative to any other component of machine 1000. This enables an operator to maximize the number of blank assemblies that can be formed by machine 1000, easily change the size of blank assemblies being formed on machine 1000, and automatically change the type of blank assemblies being formed on machine 1000 while reducing or eliminating manually adjustments of machine 1000.

What is claimed is:

1. A method of forming a container from a blank using a machine, the container including a tray and a lid, the machine including a deck mounted to a frame, a pre-form section positioned upstream from a mandrel assembly, the pre-form section including a plurality of stations and a bar extending above the deck in a container-forming direction across at least the first second stations, the mandrel assembly including a mandrel that comprises a plate and compression members coupled to each corner of the plate, the method comprising: receiving the blank at a first station of the plurality of stations; partially forming the container at the first station by folding each of a plurality of side panels of the blank; transferring the blank in a container-forming direction to at least a second station of the plurality of stations, while maintaining the partially formed container in a centered orientation using the bar; further forming the container using at least a second station of the plurality of stations, by folding a front panel assembly including a front panel and a roll-over panel of the blank; transferring the partially formed container from the pre-forming section to the mandrel assembly; actuating at least a first actuator associated with the mandrel to fold the roll-over panel to form a front wall of the container; and actuating at least a second actuator associated with the compression members of the mandrel to form corners of the tray; and folding the lid to contact the tray.

2. The method in accordance with claim 1 further comprising: applying an adhesive to the partially formed container with an adhesive applicator as the partially formed container is transferred from the pre-forming section to the mandrel assembly.

3. The method in accordance with claim 2, wherein actuating at least a first actuator associated with the compression members comprises: actuating at least the first actuator associated with a first pair of the compression members to compress a pair of glue panels of the tray to a back wall of the blank to form a back wall of the container; and actuating at least a second actuator associated with a second pair of compression members to compress the roll-over panel to the front panel of the blank to form a front wall of the tray.

4. The method in accordance with claim 1, wherein the blank includes a leading edge and an opposing trailing edge, wherein the deck includes a plurality of chains and lugs mounted to the chains, wherein the plurality of chains and the lugs are configured to advance the blank through the machine along the container-forming path direction, and wherein partially forming the container further comprises: lowering the blank between a first plurality of lugs and a second plurality of lugs, said lowering causing the first plurality of lugs to fold side panels of the leading edge of the blank and the second plurality of lugs to fold side panels of the trailing edge of the blank.

5. The method in accordance with claim 1, wherein the at least the second station includes a rod coupled to the deck, the bar including a first, upstream end, the method further comprising: further forming the tray by advancing the blank past the rod, said advancing causing the first end of the bar to fold a first glue panel at a leading edge of the blank and causing the rod to fold a first tuck panel at the leading edge of the blank.

6. The method in accordance with claim 5, wherein the at least the second station further comprises a pair of hooks, the method further comprising: activating the hooks in response to a trailing edge of the blank reaching a predetermined position; and folding, using the hooks, a second glue panel and a second tuck panel at trailing edge of the blank to further form the tray.

7. The method of claim 1 further comprises controlling speed and timing of the at least first actuator.

8. The method of claim 1 further comprises controlling speed and timing of the at least second actuator.

9. The method of claim 1 further comprises controlling speed and timing of transferring the blank from the first station to the second station.

10. The method of claim 1 further comprises controlling movement of the at least first and the second actuators independent of any other component in the machine.

* * * * *